(12) United States Patent
Liu et al.

(10) Patent No.: US 12,185,292 B2
(45) Date of Patent: Dec. 31, 2024

(54) COMMUNICATIONS METHOD AND APPARATUS

(71) Applicant: HUAWEI TECHNOLOGIES CO., LTD., Guangdong (CN)

(72) Inventors: Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/768,008

(22) PCT Filed: Sep. 4, 2020

(86) PCT No.: PCT/CN2020/113611
§ 371 (c)(1),
(2) Date: Apr. 11, 2022

(87) PCT Pub. No.: WO2021/068693
PCT Pub. Date: Apr. 15, 2021

(65) Prior Publication Data
US 2023/0319799 A1    Oct. 5, 2023

(30) Foreign Application Priority Data
Oct. 12, 2019 (CN) .......................... 201910970091.4

(51) Int. Cl.
*H04W 72/40* (2023.01)
*H04L 1/1829* (2023.01)
(Continued)

(52) U.S. Cl.
CPC ....... *H04W 72/0453* (2013.01); *H04L 1/1861* (2013.01); *H04W 72/30* (2023.01); *H04W 72/40* (2023.01)

(58) Field of Classification Search
CPC ......... H04W 72/1268; H04W 74/0841; H04W 74/0866; H04W 84/06; H04W 74/0833;
(Continued)

(56) References Cited

U.S. PATENT DOCUMENTS 10,834,704 B2 * 11/2020 Huang ............. H04W 72/0453
11,695,516 B2 *  7/2023 Huang .................. H04L 1/1812
                                                              370/312
(Continued)

FOREIGN PATENT DOCUMENTS

| CN | 106793092 A | 5/2017 |
|---|---|---|
| CN | 108024283 A | 5/2018 |

(Continued)

OTHER PUBLICATIONS

Huawei, HiSilicon, Sidelink physical layer procedures for NR V2X, 3GPP TSG RAN WG1 #98b R1-1910059, Oct. 8, 2019, total: 10 pages.

(Continued)

*Primary Examiner* — Nathan S Taylor

(57) ABSTRACT

A communications method and a terminal device are disclosed. The communications method includes: receiving, by a transmit terminal, configuration information from a network device, wherein the configuration information comprises resource pool information of a sidelink of the transmit terminal, the resource pool information comprises information about one or more resource pools, and information about one resource pool comprises one or more pieces of information about a PSFCH frequency domain resource; sending, by the transmit terminal, multicast data to receive terminals in a multicast group; and receiving, by the transmit terminal, feedback information of the multicast data from the receive terminals in the multicast group on the PSFCH frequency domain resource, wherein the PSFCH frequency (Continued)

domain resource is sufficient for all the receive terminals in the multicast group to perform HARQ feedback.

14 Claims, 6 Drawing Sheets

(51) Int. Cl.
  *H04W 72/0453* (2023.01)
  *H04W 72/30* (2023.01)
(58) Field of Classification Search
  CPC ... H04W 72/12; H04W 74/08; H04W 52/146; H04W 52/241; H04W 52/367; H04W 52/243; H04W 52/262; H04W 52/283; H04W 52/34; H04W 52/346; H04W 52/38; H04W 52/40; H04W 88/10; H04W 52/14; H04W 52/24; H04W 52/36; H04W 52/26; H04W 52/28; H04W 52/42; H04W 4/08; H04W 4/40; H04W 72/02; H04W 72/0453; H04W 72/23; H04W 72/30; H04W 72/40; H04W 28/04; H04W 72/00; H04W 72/04; H04W 92/18; H04L 1/0003; H04L 1/0009; H04L 1/00; H04L 1/1838; H04L 1/1845; H04L 1/1861; H04L 2001/0093; H04L 5/0053; H04L 5/0055; H04L 5/0094; H04L 1/1812; H04L 1/1829; H04L 1/18; H04L 5/00
  See application file for complete search history.

(56) References Cited

U.S. PATENT DOCUMENTS

| | | | |
|---|---|---|---|
| 2018/0139778 A1 | 5/2018 | Chou et al. | |
| 2019/0349895 A1* | 11/2019 | Liu | H04L 5/0094 |
| 2020/0029318 A1* | 1/2020 | Guo | H04L 1/1822 |
| 2020/0029340 A1* | 1/2020 | He | H04W 72/25 |
| 2020/0305126 A1* | 9/2020 | Li | H04L 1/1614 |
| 2020/0351032 A1* | 11/2020 | Wu | H04W 72/20 |
| 2020/0351033 A1* | 11/2020 | Ryu | H04L 1/1861 |
| 2020/0413348 A1* | 12/2020 | Ryu | H04W 48/12 |
| 2021/0007096 A1* | 1/2021 | Huang | H04L 5/0055 |
| 2021/0014831 A1* | 1/2021 | Ryu | H04W 72/02 |
| 2021/0028891 A1* | 1/2021 | Zhou | H04W 4/40 |
| 2021/0028910 A1* | 1/2021 | Cheng | H04L 1/1854 |
| 2021/0037468 A1* | 2/2021 | Huang | H04W 76/23 |
| 2021/0050950 A1* | 2/2021 | Zhou | H04W 76/14 |
| 2021/0050954 A1* | 2/2021 | Ryu | H04W 72/02 |
| 2021/0105126 A1* | 4/2021 | Yi | H04L 1/1671 |
| 2021/0337527 A1* | 10/2021 | Hui | H04W 72/20 |
| 2021/0400636 A1* | 12/2021 | Seo | H04L 1/1861 |
| 2022/0110097 A1* | 4/2022 | Zhao | H04W 4/46 |
| 2022/0116147 A1* | 4/2022 | Hou | H04L 5/0055 |
| 2022/0124679 A1* | 4/2022 | Ye | H04W 72/20 |
| 2022/0141866 A1* | 5/2022 | Liu | H04W 72/20 370/329 |
| 2022/0150000 A1* | 5/2022 | Liu | H04L 1/1864 |
| 2022/0182979 A1* | 6/2022 | Freda | H04W 72/1263 |
| 2022/0201528 A1* | 6/2022 | Shin | H04L 5/005 |
| 2022/0201654 A1* | 6/2022 | Lee | H04W 72/20 |
| 2022/0210768 A1* | 6/2022 | Zhou | H04W 4/40 |
| 2022/0255680 A1* | 8/2022 | Moon | H04L 5/0055 |
| 2022/0294570 A1* | 9/2022 | Hahn | H04L 5/0055 |
| 2022/0295517 A1* | 9/2022 | Hahn | H04L 5/0044 |
| 2022/0312388 A1* | 9/2022 | Zhao | H04W 72/1263 |
| 2022/0329301 A1* | 10/2022 | Shin | H04W 72/02 |
| 2022/0330278 A1* | 10/2022 | Hong | H04W 92/18 |
| 2022/0337348 A1* | 10/2022 | Hahn | H04L 5/0037 |
| 2022/0337355 A1* | 10/2022 | Do | H04L 5/0055 |
| 2022/0346118 A1* | 10/2022 | Wu | H04L 1/1825 |

FOREIGN PATENT DOCUMENTS

| | | | | |
|---|---|---|---|---|
| CN | 108631968 A | | 10/2018 | |
| CN | 109644455 A | | 4/2019 | |
| CN | 109691146 A | | 4/2019 | |
| CN | 109792369 A | | 5/2019 | |
| CN | 109792371 A | | 5/2019 | |
| CN | 109792594 A | | 5/2019 | |
| CN | 109891981 A | | 6/2019 | |
| CN | 110169094 A | | 8/2019 | |
| CN | 110214427 A | | 9/2019 | |
| CN | 110311762 A | | 10/2019 | |
| EP | 3952360 A1 | * | 2/2022 | ........... H04L 1/1861 |
| EP | 3955491 A1 | * | 2/2022 | ........... H04L 1/1607 |
| EP | 4007424 A1 | * | 6/2022 | ........... H04L 1/1607 |
| WO | 2017209581 A1 | | 12/2017 | |
| WO | 2018137452 A1 | | 8/2018 | |
| WO | 2019064983 A1 | | 4/2019 | |
| WO | WO-2020033704 A1 | * | 2/2020 | |
| WO | WO-2021016638 A1 | * | 1/2021 | ........... H04W 72/02 |

OTHER PUBLICATIONS

Office Action issued in JP2022-521679, dated Apr. 25, 2023, with English Translation 9 pages.
ZTE, initial consideration on NR V2X resource allocation. 3GPP TSG-RAN WG2#103bis, Chengdu, China, Oct. 8-12, 2018, R2-1814168, 7 pages.
Ericsson, Uu-based sidelink resource allocation, 3GPP TSG-RAN WG1 Meeting #97 ,R1-1907135, Reno, US, May 13-17, 2019, 9 pages.
International Search Report and Written Opinion issued in PCT/CN2020/113611, dated Dec. 15, 2020, 9 pages.
Office Action issued in CN201910970091.4, dated Aug. 27, 2021, 7 pages.
Extended European Search Report issued in EP20873682.7, dated Oct. 17, 2022, 10 pages.

* cited by examiner

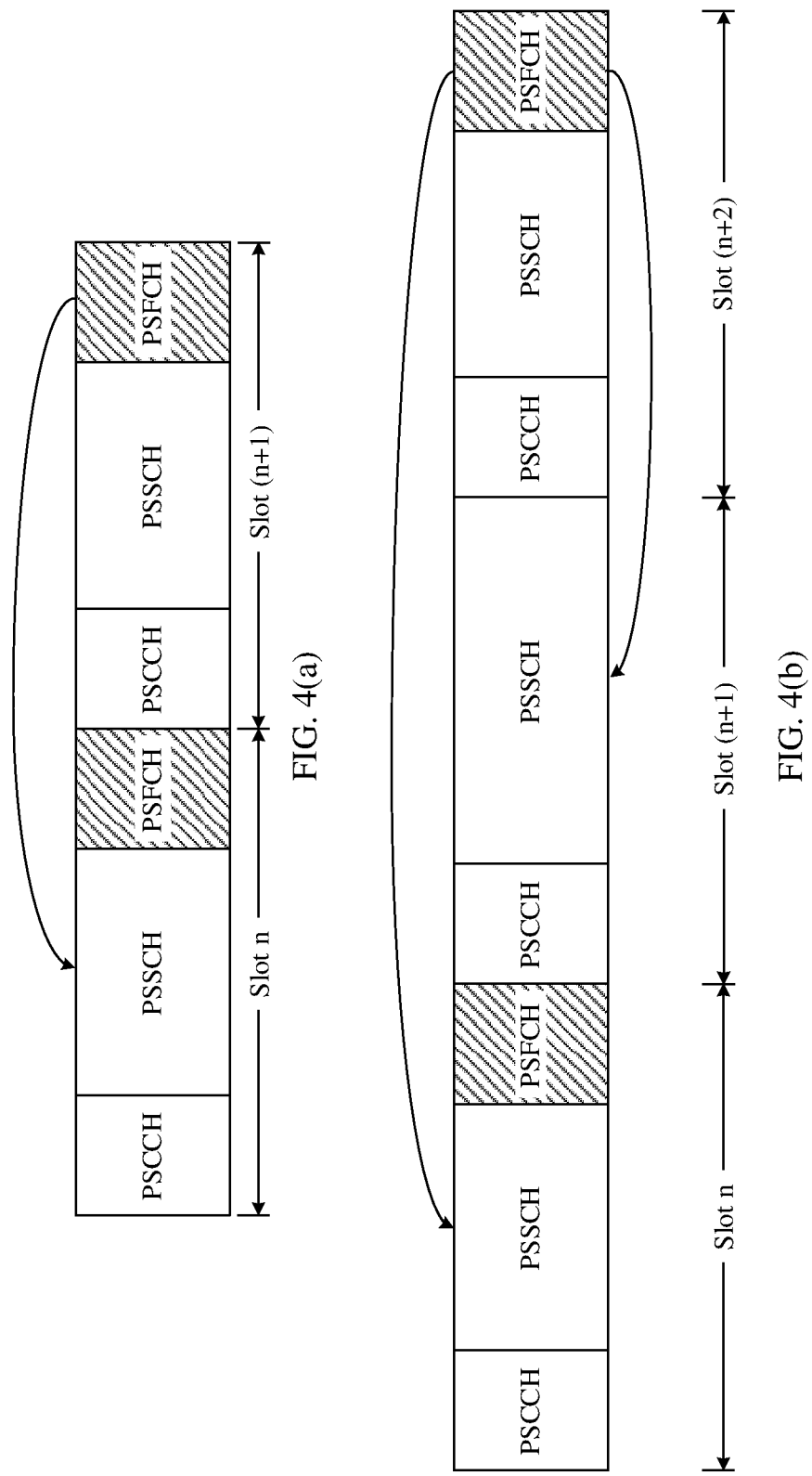

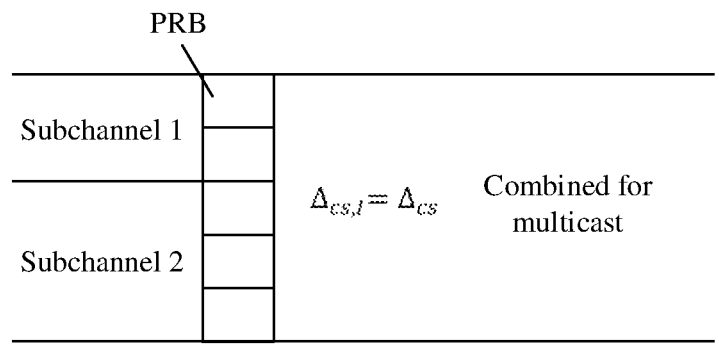
FIG. 7
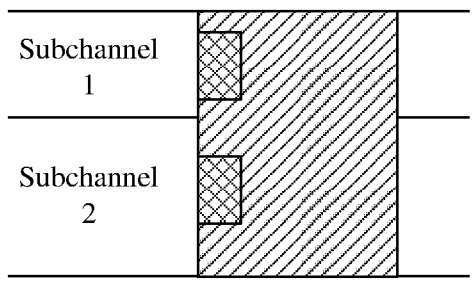
FIG. 8(a)
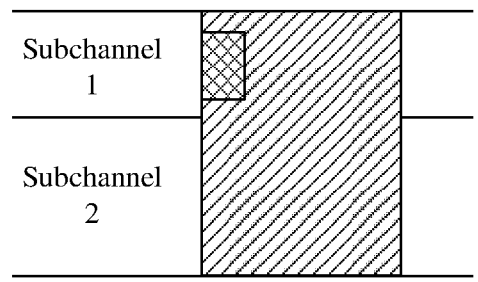
FIG. 8(b)
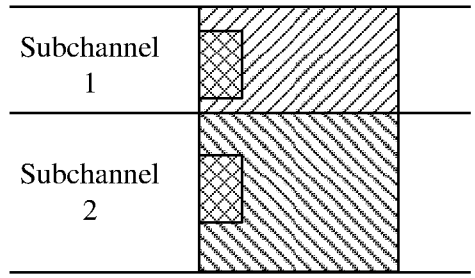
FIG. 8(c)
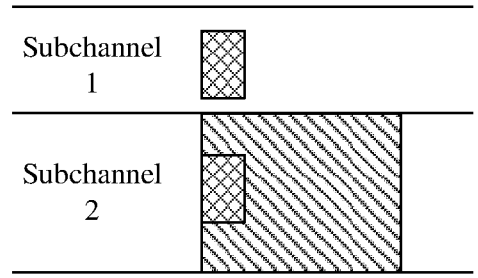
FIG. 8(d)
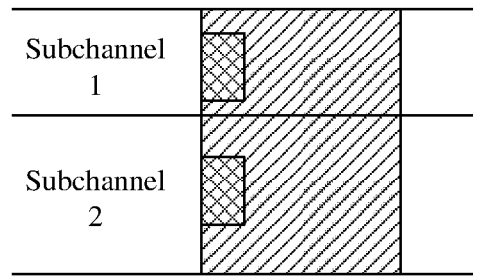
FIG. 8(e)

COMMUNICATIONS METHOD AND APPARATUS

CROSS-REFERENCE TO RELATED APPLICATIONS

This application is a national stage of International Application No. PCT/CN2020/113611, filed Sep. 4, 2020, which claims priority to Chinese Patent Application No. 201910970091.4, filed Oct. 12, 2019. All the aforementioned applications are hereby incorporated by reference in their entireties.

TECHNICAL FIELD

This application relates to the field of communications technologies, and in particular, to a communications method and apparatus.

BACKGROUND

Vehicle to everything (V2X) is a key technology for an intelligent transportation system, and is considered as one of fields with most industrial potential and most clear market demand in an internet of things system. The vehicle to everything (V2X) is usually a communications network that provides vehicle information by using sensors installed on vehicles, vehicle-mounted terminals, or the like, and implements vehicle to vehicle (V2V) communication, vehicle to infrastructure (V2I) communication, vehicle to network (V2N) communication, and vehicle to pedestrian (V2P) communication.

The V2X is characterized by wide application space, great industry potential, and strong social benefits, and is of great significance to promote the innovation and development of the automobile and information communications industry, build new models and new forms of automobile and transportation services, promote the innovation and application of technologies such as unmanned driving, driver assistance, intelligent driving, connected driving, intelligent network driving, automated driving, and car sharing, and improve transportation efficiency and safety.

In a new radio (NR) V2X multicast scenario, after a transmit terminal sends multicast data to a plurality of receive terminals through one subchannel, each receive terminal needs to reply to the transmit terminal with hybrid automatic repeat request (HARQ) feedback. The HARQ feedback is an acknowledgment (ACK) or a negative acknowledgment (NACK). The ACK indicates that the receive terminal correctly receives the multicast data, and the NACK indicates that the receive terminal does not correctly receive the multicast data. The HARQ feedback is carried on a physical sidelink feedback channel (PSFCH), and a PSFCH frequency domain resource on the subchannel may fail to meet requirements of all the receive terminals to perform HARQ feedback.

SUMMARY

Embodiments of this application provide a communications method and apparatus, to meet requirements of receive terminals in a multicast group in a multicast scenario.

To achieve the objective, this application provides the following technical solutions.

According to a first aspect, a communications method is provided, and the method includes: A transmit terminal receives, from a network device, configuration information including resource pool information of a sidelink of the transmit terminal; determines, based on the resource pool information and a quantity of receive terminals in a multicast group, a frequency domain resource including one or more subchannels; sends multicast data to the receive terminals in the multicast group on the frequency domain resource; and receives feedback information of the multicast data from the receive terminals in the multicast group on a PSFCH frequency domain resource in the frequency domain resource. The resource pool information includes information about one or more resource pools, and information about one resource pool includes one or more pieces of information about a PSFCH frequency domain resource on each subchannel in the resource pool and information about a sequence interval of sequences on a PSFCH on each subchannel. According to the method provided in the first aspect, when determining the frequency domain resource for sending the multicast data, the transmit terminal may consider the PSFCH frequency domain resource on the subchannel in the resource pool, the sequence interval of sequences on the PSFCH on the subchannel, and the quantity of receive terminals in the multicast group, to send the multicast data on one or more subchannels as required.

In a possible implementation, when the frequency domain resource includes one subchannel, the subchannel meets the following condition: a maximum sequence interval calculated based on the quantity of receive terminals in the multicast group and a PSFCH frequency domain resource on the subchannel is greater than or equal to a sequence interval of sequences on a PSFCH on the subchannel. This possible implementation can ensure that the PSFCH frequency domain resource in the frequency domain resource is sufficient for all the receive terminals in the multicast group to perform HARQ feedback.

In a possible implementation, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in sequence intervals of sequences on PSFCHs on the plurality of subchannels. This possible implementation can ensure that the PSFCH frequency domain resource in the frequency domain resource is sufficient for all the receive terminals in the multicast group to perform HARQ feedback.

In a possible implementation, that the transmit terminal determines a frequency domain resource based on the resource pool information and a quantity of receive terminals in a multicast group includes: The transmit terminal determines the frequency domain resource based on a decreased sequence interval of sequences on a PSFCH on a subchannel in the resource pool, a PSFCH frequency domain resource on the subchannel in the resource pool, and the quantity of receive terminals in the multicast group. In this possible implementation, a quantity of available sequences on the PSFCH frequency domain resource on the subchannel may be increased, to support more receive terminals in performing HARQ feedback.

In a possible implementation, when the frequency domain resource includes one subchannel, the subchannel meets the following condition: a maximum sequence interval calculated based on the quantity of receive terminals in the multicast group and a PSFCH frequency domain resource on the subchannel is greater than or equal to a decreased sequence interval of sequences on a PSFCH on the subchannel. This possible implementation can ensure that the PSFCH frequency domain resource in the frequency domain resource is sufficient for all the receive terminals in the multicast group to perform HARQ feedback.

In a possible implementation, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in decreased sequence intervals of sequences on PSFCHs on the plurality of subchannels. This possible implementation can ensure that the PSFCH frequency domain resource in the frequency domain resource is sufficient for all the receive terminals in the multicast group to perform HARQ feedback.

In a possible implementation, the maximum sequence interval is a maximum integer less than or equal to a ratio of a quantity of sequences supported by one physical resource block PRB to a quantity of sequences that need to be supported by each PRB in all the PSFCH frequency domain resources on all the subchannels included in the frequency domain resource, and the quantity of sequences that need to be supported by each PRB is a minimum integer greater than or equal to a ratio of a total quantity of sequences required by all the receive terminals in the multicast group to a quantity of PRBs included in all the PSFCH frequency domain resources on all the subchannels included in the frequency domain resource; or the maximum sequence interval is a maximum integer less than or equal to a ratio of a total quantity of sequences supported by PRBs included in all the PSFCH frequency domain resources on all the subchannels included in the frequency domain resource to a total quantity of sequences required by all the receive terminals in the multicast group. This possible implementation can ensure that the PSFCH frequency domain resource in the frequency domain resource is sufficient for all the receive terminals in the multicast group to perform HARQ feedback.

In a possible implementation, the method further includes: The transmit terminal sends indication information to at least one receive terminal in the multicast group, where the indication information indicates to decrease the sequence interval of sequences on the PSFCH on the subchannel in the resource pool, or the indication information indicates the decreased sequence interval of sequences on the PSFCH on the subchannel in the resource pool, or the indication information indicates a decrement of the sequence interval of sequences on the PSFCH on the subchannel in the resource pool. In this possible implementation, a same sequence interval can be used by the transmit terminal and the receive terminal, to ensure normal communication between the transmit terminal and the receive terminal.

According to a second aspect, a communications method is provided. The method includes: A receive terminal receives multicast data including one or more subchannels from a transmit terminal on a frequency domain resource, further receives indication information, and sends feedback information of the multicast data to the transmit terminal on a PSFCH frequency domain resource in the frequency domain resource based on the indication information. The indication information indicates to decrease a sequence interval of sequences on a PSFCH on a subchannel in a resource pool, or the indication information indicates a decreased sequence interval of sequences on a PSFCH on a subchannel in a resource pool, or the indication information indicates a decrement of a sequence interval of sequences on a PSFCH on a subchannel in a resource pool. According to the method provided in the second aspect, a same sequence interval can be used by the transmit terminal and the receive terminal, to ensure normal communication between the transmit terminal and the receive terminal.

According to a third aspect, a communications apparatus is provided. The communications apparatus includes a communications unit and a processing unit. The communications unit is configured to receive, from a network device, configuration information including resource pool information of a sidelink of the apparatus, where the resource pool information includes information about one or more resource pools, and information about one resource pool includes one or more pieces of information about a PSFCH frequency domain resource on each subchannel in the resource pool and information about a sequence interval of sequences on a PSFCH on each subchannel. The processing unit is configured to determine, based on the resource pool information and a quantity of receive terminals in a multicast group, a frequency domain resource including one or more subchannels. The communications unit is further configured to send multicast data to the receive terminals in the multicast group on the frequency domain resource, and receive feedback information of the multicast data from the receive terminals in the multicast group on a PSFCH frequency domain resource in the frequency domain resource.

In a possible implementation, when the frequency domain resource includes one subchannel, the subchannel meets the following condition: a maximum sequence interval calculated based on the quantity of receive terminals in the multicast group and a PSFCH frequency domain resource on the subchannel is greater than or equal to a sequence interval of sequences on a PSFCH on the subchannel.

In a possible implementation, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in sequence intervals of sequences on PSFCHs on the plurality of subchannels.

In a possible implementation, the processing unit is further configured to determine the frequency domain resource based on a decreased sequence interval of sequences on a PSFCH on a subchannel in the resource pool, a PSFCH frequency domain resource on the subchannel in the resource pool, and the quantity of receive terminals in the multicast group.

In a possible implementation, when the frequency domain resource includes one subchannel, the subchannel meets the following condition: a maximum sequence interval calculated based on the quantity of receive terminals in the multicast group and a PSFCH frequency domain resource on the subchannel is greater than or equal to a decreased sequence interval of sequences on a PSFCH on the subchannel.

In a possible implementation, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in decreased sequence intervals of sequences on PSFCHs on the plurality of subchannels.

In a possible implementation, the maximum sequence interval is a maximum integer less than or equal to a ratio of a quantity of sequences supported by one physical resource block PRB to a quantity of sequences that need to be supported by each PRB in all the PSFCH frequency domain resources on all the subchannels included in the frequency domain resource, and the quantity of sequences that need to be supported by each PRB is a minimum integer greater than or equal to a ratio of a total quantity of sequences required by all the receive terminals in the multicast group to a quantity of PRBs included in all the PSFCH frequency domain resources on all the subchannels included in the frequency domain resource; or the maximum sequence interval is a maximum integer less than or equal to a ratio of a total quantity of sequences supported by PRBs included in all the PSFCH frequency domain resources on all the subchannels included in the frequency domain resource to a total quantity of sequences required by all the receive terminals in the multicast group.

In a possible implementation, the communications unit is further configured to send indication information to at least one receive terminal in the multicast group, where the indication information indicates to decrease the sequence interval of sequences on the PSFCH on the subchannel in the resource pool, or the indication information indicates the decreased sequence interval of sequences on the PSFCH on the subchannel in the resource pool, or the indication information indicates a decrement of the sequence interval of sequences on the PSFCH on the subchannel in the resource pool.

According to a fourth aspect, a communications apparatus is provided, including a communications unit and a processing unit. The processing unit is configured to receive multicast data from a transmit terminal by using the communications unit on a frequency domain resource including one or more subchannels. The processing unit is further configured to receive indication information by using the communications unit, where the indication information indicates to decrease a sequence interval of sequences on a PSFCH on a subchannel in a resource pool, or the indication information indicates a decreased sequence interval of sequences on a PSFCH on a subchannel in a resource pool, or the indication information indicates a decrement of a sequence interval of sequences on a PSFCH on a subchannel in a resource pool. The processing unit is further configured to send feedback information of the multicast data to the transmit terminal on a PSFCH frequency domain resource in the frequency domain resource based on the indication information by using the communications unit.

According to a fifth aspect, a communications apparatus is provided and includes a processor. The processor is connected to a memory. The memory is configured to store computer-executable instructions, and the processor executes the computer-executable instructions stored in the memory, to implement any method provided in the first aspect or the second aspect. The memory and the processor may be integrated together, or may be independent components. If the memory and the processor are independent components, the memory may be located inside the communications apparatus, or may be located outside the communications apparatus.

In a possible implementation, the processor includes a logic circuit, and further includes at least one of an input interface and an output interface. The output interface is configured to perform a sending action in a corresponding method, and the input interface is configured to perform a receiving action in the corresponding method.

In a possible implementation, the communications apparatus further includes a communications interface and a communications bus. The processor, the memory, and the communications interface are connected through the communications bus. The communications interface is configured to perform receiving and sending actions in the corresponding method. The communications interface may also be referred to as a transceiver. Optionally, the communications interface includes at least one of a transmitter and a receiver. In this case, the transmitter is configured to perform the sending action in the corresponding method, and the receiver is configured to perform the receiving action in the corresponding method.

In a possible implementation, the communications apparatus exists in a product form of a chip.

According to a sixth aspect, a communications system is provided, and includes the communications apparatus provided in the third aspect and the communications apparatus provided in the fourth aspect.

According to a seventh aspect, a computer-readable storage medium is provided, and includes instructions. When the instructions are run on a computer, the computer is enabled to perform any method provided in the first aspect or the second aspect.

According to an eighth aspect, a computer program product including instructions is provided. When the instructions are run on a computer, the computer is enabled to perform any method provided in the first aspect or the second aspect.

For technical effects brought by any implementation in the third to the eighth aspects, refer to technical effects brought by corresponding implementations in the first aspect to the second aspect.

BRIEF DESCRIPTION OF DRAWINGS

FIG. 3(a), FIG. 3(b), FIG. 4(a), and FIG. 4(b) each is a schematic diagram of resources occupied by channels on a sidelink according to an embodiment of this application;

FIG. 6 and FIG. 7 each is a schematic diagram of a calculated maximum sequence interval according to an embodiment of this application;

FIG. 8(a) to FIG. 8(e) are schematic diagrams of PSSCH resources and PSCCH resources according to an embodiment of this application;

DESCRIPTION OF EMBODIMENTS

In the present disclosure, unless otherwise specified, "/" means "or". For example, A/B may represent A or B. The term "and/or" in this specification describes only an association relationship for describing associated objects and indicates that there may be three relationships. For example, A and/or B may represent the following three cases: Only A exists, both A and B exist, and only B exists. In addition, "at least one" means one or more, and "a plurality of" means two or more. The terms such as "first" and "second" do not limit a quantity and an execution sequence, and the terms such as "first" and "second" do not indicate a definite difference.

It should be noted that in the present disclosure, the term such as "example" or "for example" is used to represent giving an example, an illustration, or a description. Any embodiment or design scheme described as "example" or "for example" in this application should not be explained as being more preferred or having more advantages than another embodiment or design scheme. Exactly, use of the word "example", "for example", or the like is intended to present a related concept in a specific manner.

Figure 1:
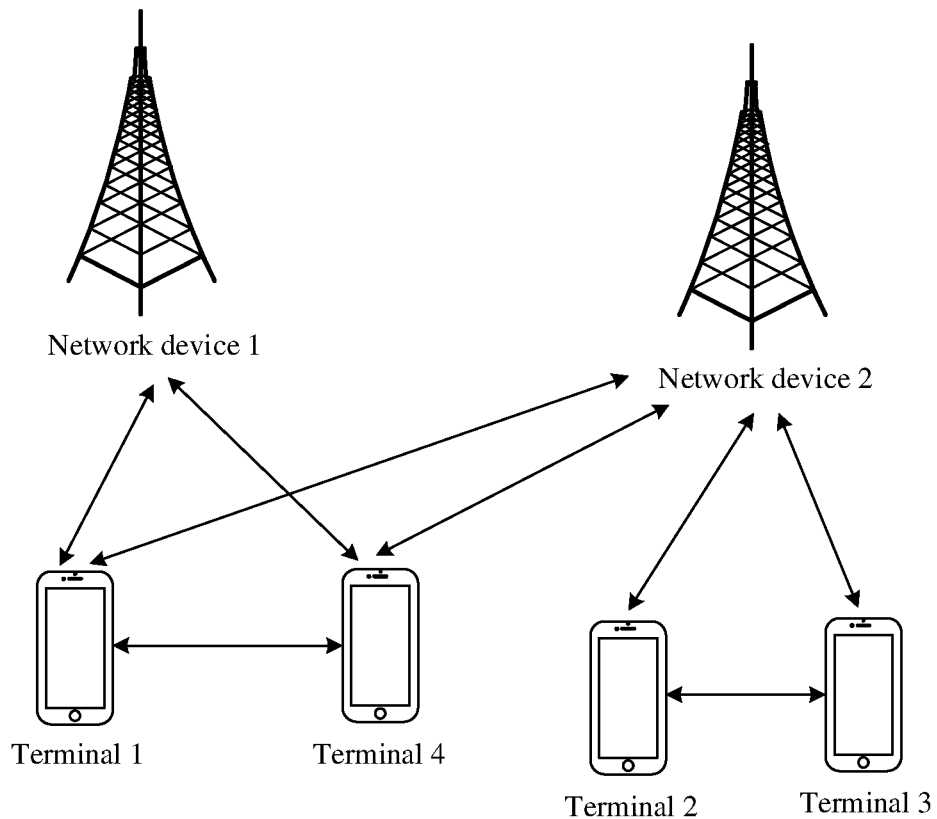
FIG. 1 is a schematic diagram of a system architecture according to an embodiment of this application.

Network elements in embodiments of this application include a network device and a terminal in a communications system. Refer to FIG. 1, a method provided in embodiments of this application mainly relates to communication between terminals and communication between a terminal and a network device.

A communications system in embodiments of this application includes but is not limited to a Long Term Evolution (LTE) system, a 5th generation (5G) system, an NR system, a wireless local area network (WLAN) system, a future evolved system, or a plurality of converged communications systems. The 5G system may be a non-standalone (NSA) 5G system or a standalone (SA) 5G system.

The network device in embodiments of this application is an entity that is on a network side and that is configured to send a signal, receive a signal, or send a signal and receive a signal. The network device may be an apparatus that is deployed on a radio access network (RAN) and that provides a wireless communications function for a terminal, for example, may be a transmission reception point (TRP), a base station, or control nodes in various forms (for example, a network controller and a radio controller (for example, a radio controller in a cloud radio access network (CRAN) scenario)). Specifically, the network device may be a macro base station, a micro base station (also referred to as a small cell), a relay station, an access point (AP), or the like in various forms, or may be an antenna panel of a base station. The control node may be connected to a plurality of base stations, and configure resources for a plurality of terminal devices within coverage of the plurality of base stations. In systems using different radio access technologies, devices that have base station functions may have different names. For example, the device may be referred to as an evolved NodeB (eNB or eNodeB) in the LTE system, or may be referred to as a next generation node base station (gNB) in the 5G system or the NR system. A specific name of the base station is not limited in embodiments of this application. The network device may alternatively be a network device in a future evolved public land mobile network (PLMN) or the like.

The terminal in embodiments of this application is on a user side and configured to receive a signal, send a signal, or receive a signal and send a signal. The terminal is configured to provide a user with one or more of a voice service and a data connectivity service. Alternatively, the terminal may be referred to as user equipment (UE), a terminal device, an access terminal, a subscriber unit, a subscriber station, a mobile station, a remote station, a remote terminal, a mobile device, a user terminal, a wireless communications device, a user agent, or a user apparatus. The terminal may be a V2X device, for example, a smart car (or intelligent car), a digital car, an unmanned car (driverless car, pilotless car, or automobile), an automatic car (self-driving car or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), a new energy vehicle, or a road site unit (RSU). Alternatively, the terminal may be a D2D device, for example, an electricity meter or a water meter. Alternatively, the terminal may be a mobile station (MS), a subscriber unit, an unmanned aerial vehicle, an internet of things (IoT) device, a station (ST) in a WLAN, a cellular phone, a smart phone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device with a wireless communications function, a computing device or another processing device connected to a wireless modem, a vehicle-mounted device, or a wearable device (which may also be referred to as a wearable intelligent device). Alternatively, the terminal may be a terminal in a next generation communications system, for example, a terminal in a 5G system, a terminal in a future evolved PLMN, or a terminal in an NR system.

The method provided in embodiments of this application is applicable to but is not limited to the following fields: device to device (D2D), V2X, unmanned driving, automated driving (ADS), driver assistance (ADAS), intelligent driving, connected driving, intelligent network driving, car sharing, and the like.

In the NR, a V2X architecture is classified into standalone deployment and multi-RAT dual connectivity (MR-DC) deployment. In a standalone deployment scenario, two terminals (for example, a terminal 2 and a terminal 3 in FIG. 1) that perform V2X communication access a same network device, and the network device manages or configures the two terminals. For example, the network device may be a gNB, a next-generation eNB (ng-eNB), or an eNB. In a multi-RAT dual connectivity deployment scenario, two terminals that perform V2X communication each access a main node (MN) and a secondary node (SN). For example, a terminal 1 and a terminal 4 in FIG. 1 each accesses a network device 1 and a network device 2. One of the network device 1 and the network device 2 is the main node, and the other is the secondary node. The main node may manage or configure the terminals that perform V2X communication.

In a V2X scenario and another communications scenario, a communications link on which terminals perform direct communication may be referred to as a sidelink (SL). On the SL, a transmit terminal may directly send data to a receive terminal, and does not need to first send the data to a network device and then send the data to the receive terminal through forwarding by a core network, to greatly reduce a data transmission delay.

To make embodiments of the present disclosure clearer, the following briefly describes concepts and some content that are related to embodiments of this application.

1. SL HARQ Feedback

An SL HARQ combines forward error correction (FEC) and an automatic repeat request (ARQ). The FEC enables a receive terminal to correct some errors by adding redundant information, to reduce a quantity of retransmissions. For an error that cannot be corrected through the FEC, the receive terminal requests, by using an ARQ mechanism, a transmit terminal to retransmit data. The receive terminal detects, by using an error detection code such as cyclic redundancy check (CRC), whether an error occurs in received data. If no error occurs, the receive terminal sends an ACK to the transmit terminal. After receiving the ACK, the transmit terminal sends next data. If an error occurs, the receive terminal sends a NACK to the transmit terminal. After receiving the NACK, the transmit terminal retransmits the data. The ACK and the NACK are HARQ feedback.

In the ARQ mechanism described above, after the receive terminal receives a data packet, if a decoding error occurs, the receive terminal discards the data packet and requests retransmission. The data packet in which the decoding error occurs includes useful information. If the data packet is discarded, the useful information is lost. By using a HARQ with soft combining, the data packet in which the decoding error occurs is stored in a HARQ buffer, and is soft-combined with a retransmitted data packet that is subsequently received. Then decoding is performed. Similarly, if the decoding still fails, the foregoing process may be further repeated. Retransmitted data that is newly received is combined with data in the buffer, and decoding is performed again. Compared with separate decoding (to be specific, data transmitted each time is separately decoded and is not combined with previous data for decoding), this improves the success probability of decoding.

LTE V2X supports only a broadcast service. Therefore, the SL HARQ feedback is not supported. NR V2X supports unicast, multicast, and broadcast services, but supports the SL HARQ feedback only in a unicast scenario and a multicast scenario.

2. SL Resource Pool

In the NR, SL transmission is based on a resource pool. The resource pool is a logical concept. A resource pool includes a plurality of physical resources, and any physical resource may be used to transmit data.

It should be noted that a network device configures one or more resource pools for a plurality of terminals, and the plurality of terminals share the one or more resource pools. When transmitting data, a terminal needs to use a physical resource from the resource pool for transmission. In one case, the terminal is controlled by the network device, to select a physical resource from the resource pool based on indication information sent by the network device, to transmit data. In another case, the terminal independently selects a physical resource from the resource pool to transmit data.

3. Subchannel

Each resource pool includes one or more subchannels. According to current progress of related communications standards, frequency domain resource amounts (in other words, quantities of physical resource blocks (PRB)) of all subchannels in a resource pool are the same. Frequency domain resource amounts on subchannels in different resource pools may be the same or may be different.

Figure 2:
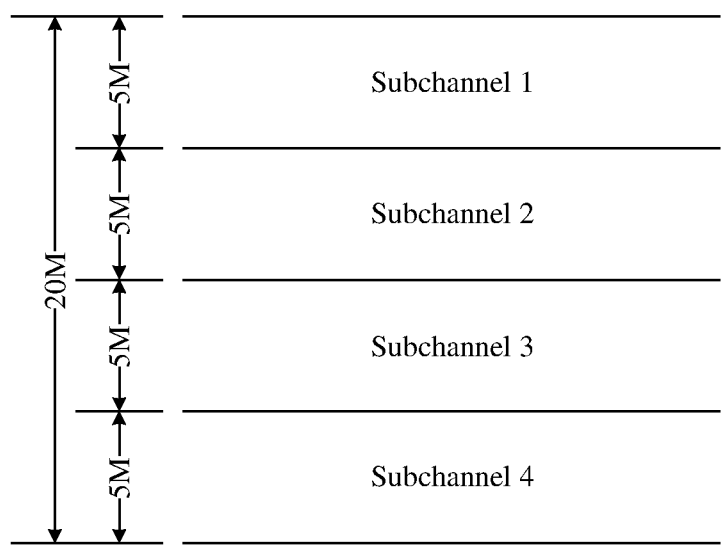
FIG. 2 is a schematic diagram of a subchannel according to an embodiment of this application.

For example, as shown in FIG. 2, if a bandwidth occupied by physical resources in a resource pool is 20M, and 20M is divided into four subchannels, a bandwidth occupied by one subchannel is 5M.

A quantity of subchannels included in a resource pool and a bandwidth occupied by each subchannel may be configured by a network device for a terminal.

4. Physical Sidelink Control Channel (PSCCH), Physical Sidelink Shared Channel (PSSCH), or PSFCH A subchannel may include a PSCCH, a PSSCH, and a PSFCH. The PSCCH is used to carry control information of SL data, and the control information may be specifically carried in sidelink control information (SCI) on the PSCCH. The PSSCH is used to carry the SL data. The PSFCH is used to carry HARQ feedback of the SL data.

Figure 3A:
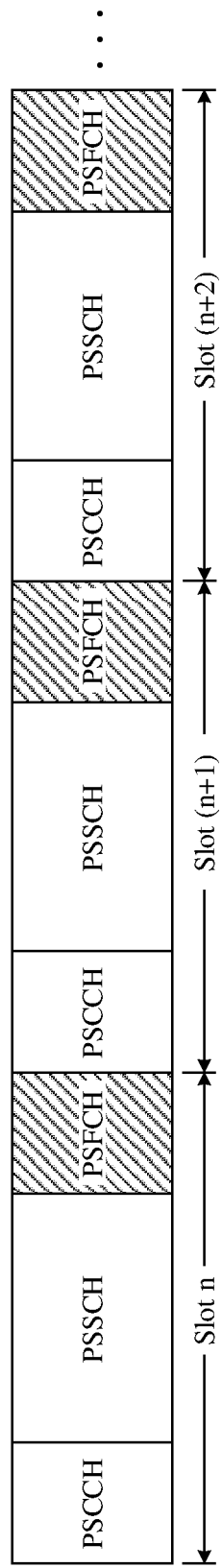
Figure 3B:
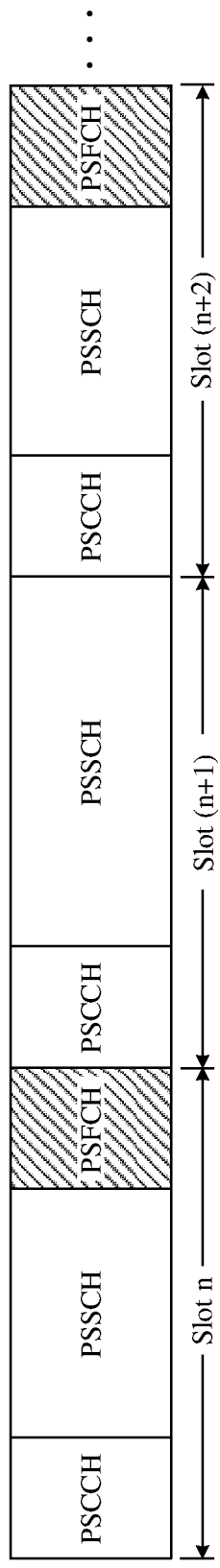

For a multicast scenario, in embodiments of the present disclosure, it is considered that the PSFCH includes one or two symbols in time domain and includes one or more PRBs in frequency domain, and the one or more PRBs are a part of PSSCH frequency domain resources. In a resource pool, a periodicity of a PSFCH time-frequency resource (referred to as a PSFCH resource for short) is N slots, and a value of N is currently 1, 2, or 4. For example, FIG. 3(a) and FIG. 3(b) respectively show schematic diagrams of locations of PSFCH resources when N=1 and N=2.

For a PSSCH in a slot n (n is an integer greater than or equal to 0), a PSFCH corresponding to the PSSCH appears in a slot (n+a), and a is a minimum integer greater than or equal to K. Currently, a value of K is not determined. Assuming that all terminals have same K, PSFCHs corresponding to N PSSCHs need to share one PSFCH resource. For example, refer to FIG. 4(a). Assuming that N=1 and a=1, HARQ feedback for SL data carried on a PSSCH in a slot n needs to be performed by using a PSFCH resource in a slot (n+1). In FIG. 4(b), assuming that N=2 and a=1, HARQ feedback for SL data carried on PSSCHs in a slot n and a slot (n+1) needs to be performed by using a PSFCH resource in a slot (n+2). HARQ feedback for the SL data carried on the PSSCH in the slot n needs to be performed by using a part of the PSFCH resource in the slot (n+2), and HARQ feedback for the SL data carried on the PSSCH in the slot (n+2) needs to be performed by using the other part of the PSFCH resource in the slot (n+2).

5. Sequence Interval

A PSFCH resource may carry sequences, and the sequences are at a specific sequence interval. A sequence interval is a quantity of bits by which cyclic shift is performed on a sequence. For example, (1, 2, 3, 4) is a sequence, and then a sequence (2, 3, 4, 1) is obtained by performing cyclic shift by 1 bit. In this case, a sequence interval between the two sequences is 1. For sequences on a PSFCH resource on each subchannel, sequence intervals may be the same or may be different, and may be further configured by the network device.

In an existing communications standard, sequences on a PSFCH resource including one PRB and one symbol is used to represent ACKs/NACKs. In this case, there are a total of 12 subcarriers on one PRB, and therefore a maximum of 12 mutually orthogonal sequences may be supported. These sequences are obtained by performing cyclic shift on a base sequence (for example, a sequence in physical uplink control channel (PUCCH) format 0). The base sequence may be referred to as a sequence 0, and a sequence obtained through shifting by x may be referred to as a sequence x. When different sequences identify different ACKs/NACKs, a bit error rate between the different ACKs/NACKs is related to a sequence interval, and a larger sequence interval indicates a lower bit error rate.

In a multicast scenario, one transmit terminal sends multicast data to a plurality of receive terminals. One receive terminal may use one sequence to represent an ACK, and use another sequence to represent a NACK. One PRB supports 12 sequences, and can support HARQ feedback of a maximum of six receive terminals. When there are a large quantity of terminals in a multicast group, a problem that sequences are insufficient may occur. For example, there are eight terminals in a multicast group, one terminal initiates multicast, and at least other seven terminals need to be supported in feeding back ACKs/NACKs. However, a PSFCH frequency domain resource has only one PRB, and therefore the seven terminals cannot be supported in simultaneously feeding back ACKs/NACKs.

Figure 5:
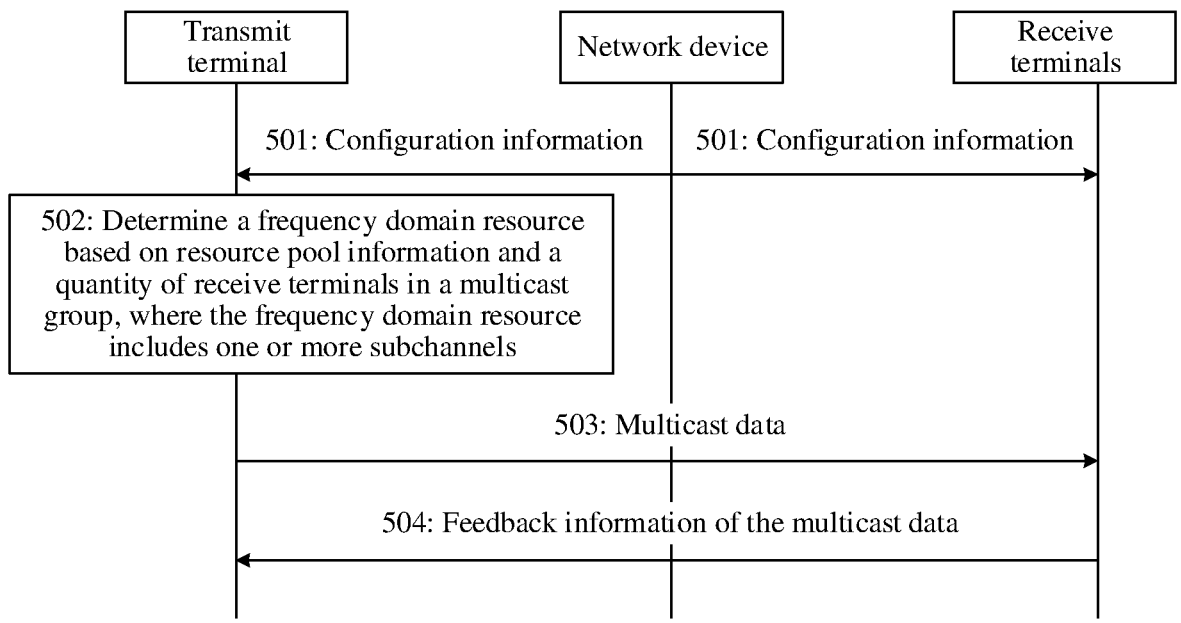
FIG. 5 is a flowchart of a communications method according to an embodiment of this application.

To resolve this problem, embodiments of this application provide a communications method (which may also be referred to as a frequency domain resource determining method). As shown in FIG. 5, the method includes the following steps.

501: A network device sends configuration information to a transmit terminal in a multicast group and receive terminals in the multicast group. The configuration information includes resource pool information of a sidelink of a corresponding terminal. Correspondingly, the transmit terminal in the multicast group and the receive terminals in the multicast group receive the configuration information from the network device.

The resource pool information includes information about one or more resource pools, and information about one resource pool includes one or more pieces of information about a PSFCH frequency domain resource on each subchannel in the resource pool and information about a sequence interval of sequences on a PSFCH on each subchannel.

The information about a PSFCH frequency domain resource on each subchannel may be information about a bandwidth occupied by the PSFCH frequency domain resource, or may be information about a quantity of PRBs included in the PSFCH frequency domain resource. This is not limited in embodiments of this application. The sequence interval of sequences on the PSFCH on the subchannel may be configured by the network device for a terminal, or may be determined by the network device and the terminal through negotiation.

Optionally, the information about one resource pool further includes one or more of: information about a PSFCH time domain resource on each subchannel, for example, information about a symbol occupied by the PSFCH, and a PSFCH resource periodicity, for example, one slot, two slots, or four slots.

It should be noted that step 501 may be performed when a terminal in the multicast group is to send data, or may be performed before a terminal in the multicast group is to send data. When sending the configuration information to the terminals in the multicast group, the network device does not distinguish between the transmit terminal and the receive terminal, and configures a same resource pool for all the terminals. Therefore, step 501 may also be described as: the network device sends the configuration information to the terminals in the multicast group. Correspondingly, the terminals in the multicast group receive the configuration information from the network device.

Optionally, a PSFCH frequency domain resource on a subchannel is a frequency domain resource corresponding to a resource block in a PSFCH resource periodicity of the subchannel, and the resource block includes a slot and a bandwidth of the subchannel.

It should be noted that the PSFCH resource periodicity is N slots. When N is greater than 1, N PSSCHs may need to share a PSFCH frequency domain resource. Therefore, the PSFCH frequency domain resource shared by the N PSSCHs is divided into N shares (the PSFCH frequency domain resource may be evenly divided or not evenly divided), and a PSFCH frequency domain resource on one subchannel is one of the N shares of frequency domain resources. For example, in FIG. 4(b), a PSFCH frequency domain resource in a slot (n+2) on a subchannel may be divided into two shares, and one share is a PSFCH frequency domain resource on the subchannel.

502: The transmit terminal determines a frequency domain resource based on the resource pool information and a quantity of receive terminals in the multicast group. The frequency domain resource includes one or more subchannels.

The frequency domain resource is a frequency domain resource corresponding to a PSSCH, and the frequency domain resource is used to send multicast data.

503: The transmit terminal sends the multicast data to the receive terminals in the multicast group on the frequency domain resource. Correspondingly, the receive terminals in the multicast group receive the multicast data from the transmit terminal on the frequency domain resource.

504: The receive terminals in the multicast group send feedback information of the multicast data to the transmit terminal on a PSFCH frequency domain resource in the frequency domain resource. Correspondingly, the transmit terminal receives the feedback information of the multicast data from the receive terminals in the multicast group on the PSFCH frequency domain resource in the frequency domain resource.

The feedback information of the multicast data may be HARQ feedback for the multicast data, and may be specifically an ACK/NACK. Optionally, the PSFCH frequency domain resource in the frequency domain resource is sufficient for all the receive terminals in the multicast group to perform HARQ feedback.

It may be understood that when the receive terminals send the feedback information of the multicast data to the transmit terminal, both the frequency domain resource and a time domain resource are required. The time domain resource may be configured by the network device for the receive terminals, and may be one symbol, two symbols, or other quantity of symbols. In embodiments of this application, only the PSFCH frequency domain resource is concerned. Therefore, the method provided in embodiments of this application is described only from a perspective of a frequency domain resource.

According to the communications method provided in embodiments of this application, when determining the frequency domain resource for sending the multicast data, the transmit terminal may consider the PSFCH frequency domain resource on the subchannel in the resource pool, the sequence interval of sequences on the PSFCH on the subchannel, and the quantity of receive terminals in the multicast group, to send the multicast data on one or more subchannels as required. For example, the PSFCH frequency domain resource in the frequency domain resource may be as sufficient as possible for all the receive terminals in the multicast group to perform HARQ feedback.

Step 502 may be specifically implemented in Manner 1 or Manner 2 below.

Manner 1: The transmit terminal directly determines the frequency domain resource based on the resource pool information and the quantity of receive terminals in the multicast group.

Manner 1 is specifically described below in Case 1.1 and Case 1.2.

Case 1.1: The frequency domain resource includes one subchannel.

In Case 1.1, the subchannel included in the frequency domain resource meets Condition 1.1 below.

Condition 1.1: A maximum sequence interval calculated based on the quantity of receive terminals in the multicast group and a PSFCH frequency domain resource on the subchannel is greater than or equal to a sequence interval of sequences on a PSFCH on the subchannel.

The maximum sequence interval may be determined by using Method 1 or Method 2 below.

Method 1: The maximum sequence interval is a maximum integer less than or equal to a ratio of a quantity of sequences supported by one PRB to a quantity of sequences that need to be supported by each PRB in all the PSFCH frequency domain resources on the subchannel included in the frequency domain resource. The quantity of sequences that need to be supported by each PRB is a minimum integer greater than or equal to a ratio of a total quantity of sequences required by all the receive terminals in the multicast group to a quantity of PRBs included in all the PSFCH frequency domain resources on the subchannel included in the frequency domain resource.

If the quantity of PRBs included in the PSFCH frequency domain resource on the subchannel is denoted as $N_i$, the quantity of receive terminals in the multicast group is denoted as M, a subcarrier spacing is denoted as $N_{sc}$, and the maximum sequence interval is denoted as $\Delta_{cs,i}$, $$\Delta_{cs,i} = \left\lfloor \frac{N_{sc}}{\left\lceil \frac{2 \times M}{N_i} \right\rceil} \right\rfloor, \text{ where } N_{sc} = 12.$$

Method 2: The maximum sequence interval is a maximum integer less than or equal to a ratio of a total quantity of sequences supported by PRBs included in the PSFCH frequency domain resource on the subchannel included in the frequency domain resource to a total quantity of sequences required by all the receive terminals in the multicast group.

In Method 2, $$\Delta_{cs,i} = \left\lfloor \frac{N_{cs} \times N_i}{2 \times M} \right\rfloor.$$

For meanings and values of the parameters, refer to related descriptions in Method 1.

Figure 6:
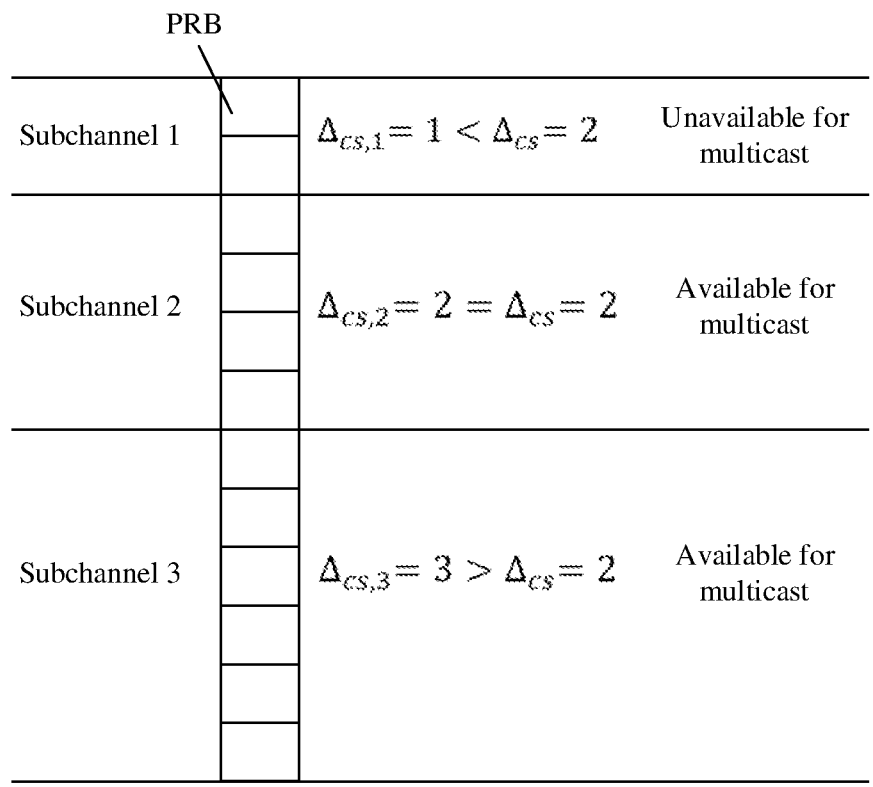

For example, as shown in FIG. 6, the sequence interval of sequences on a PSFCH on the subchannel is denoted as $\Delta cs$. If a quantity of PRBs included in a PSFCH frequency domain resource on a subchannel 1 is $N_1=2$, a quantity of PRBs included in a PSFCH frequency domain resource on a subchannel 2 is $N_2=4$, a quantity of PRBs included in a PSFCH frequency domain resource on a subchannel 3 is $N_3=6$, $\Delta_{cs}=2$, and M=12, the maximum sequence interval is calculated by using Method 1 or Method 2, $\Delta_{cs,1}=1$, $\Delta_{cs,2}=2$, and $\Delta_{cs,3}=3$. In this case, the subchannel 2 and the subchannel 3 may be used for multicast transmission, and the transmit terminal may determine the subchannel 2 or the subchannel 3 as the frequency domain resource.

In Case 1.1, optionally, step 502 includes the following step during specific implementation.

502-A: The transmit terminal determines a resource pool, and determines the frequency domain resource in the resource pool.

Step 502-A may be implemented in Manner 1.1 or Manner 1.2 below.

Manner 1.1

The transmit terminal determines the resource pool based on the resource pool information and the quantity of receive terminals in the multicast group, and determines the frequency domain resource in the resource pool.

During specific implementation of Manner 1.1, the transmit terminal may determine, based on the resource pool information and the quantity of receive terminals in the multicast group, whether a subchannel in the resource pool meets Condition 1.1 above. If yes, the transmit terminal determines that the resource pool can carry the multicast data, and selects, from the resource pool, a subchannel that meets Condition 1.1 as the frequency domain resource.

In Manner 1.1, quantities of PRBs included in frequency domain resources on subchannels in the resource pool may be the same. In this case, the transmit terminal may determine, based on a PSFCH frequency domain resource on any subchannel in the resource pool, a sequence interval of sequences on a PSFCH, and the quantity of receive terminals in the multicast group, whether the subchannel in the resource pool meets Condition 1.1 above. If yes, the transmit terminal determines that the resource pool can carry the multicast data, and selects, from the resource pool, a subchannel that is not used by another terminal as the frequency domain resource.

Manner 1.2

The transmit terminal determines the resource pool, and determines the frequency domain resource in the resource pool based on the resource pool information and the quantity of receive terminals in the multicast group.

During specific implementation of Manner 1.2, the transmit terminal may first determine the resource pool, and then determine, based on a PSFCH frequency domain resource on a subchannel in the resource pool, a sequence interval of sequences on a PSFCH, and the quantity of receive terminals in the multicast group, whether a subchannel in the resource pool meets Condition 1.1 above. If yes, the transmit terminal determines the subchannel as the frequency domain resource.

In Manner 1.2, a manner of determining the resource pool by the transmit terminal is not limited in embodiments of this application. For example, the transmit terminal may randomly select, from configured resource pools, a resource pool as the resource pool carrying the multicast data, or may select, from configured resource pools, a resource pool with a minimum load as the resource pool carrying the multicast data.

Case 1.2: The frequency domain resource includes a plurality of subchannels.

In Case 1.2, the plurality of subchannels meet Condition 1.2 below.

Condition 1.2: A maximum sequence interval calculated based on the quantity of receive terminals in the multicast group and all PSFCH frequency domain resources on the plurality of subchannels is greater than or equal to a minimum sequence interval in sequence intervals of sequences on PSFCHs on the plurality of subchannels.

It may be understood that if the sequence intervals of sequences on PSFCHs on the plurality of subchannels are the same, the maximum sequence interval is greater than or equal to a sequence interval of sequences on a PSFCH on a subchannel in the plurality of subchannels.

The maximum sequence interval may be determined by using Method 3 or Method 4 below.

Method 3: The maximum sequence interval is a maximum integer less than or equal to a ratio of a quantity of sequences supported by one PRB to a quantity of sequences that need to be supported by each PRB in all the PSFCH frequency domain resources on all the subchannels included in the frequency domain resource. The quantity of sequences that need to be supported by each PRB is a minimum integer greater than or equal to a ratio of a total quantity of sequences required by all the receive terminals in the multicast group to a quantity of PRBs included in all the PSFCH frequency domain resources on all the subchannels included in the frequency domain resource.

It is assumed that the plurality of subchannels are I subchannels, a quantity of PRBs included in a PSFCH frequency domain resource on the $i^{th}$ subchannel in the I subchannels is denoted as $N_i$, the quantity of receive terminals in the multicast group is denoted as M, and a subcarrier spacing is denoted as $N_{sc}$. If the maximum sequence interval obtained through calculation is denoted as $$\Delta_{cs,I}, \Delta_{cs,I} = \left\lfloor \frac{N_{sc}}{\left\lceil \frac{2 \times M}{\sum_{i}^{i \in I} N_i} \right\rceil} \right\rfloor, \text{ where } N_{sc} = 12.$$

Method 4: The maximum sequence interval is a maximum integer less than or equal to a ratio of a total quantity of sequences supported by PRBs included in all the PSFCH frequency domain resources on all the subchannels included in the frequency domain resource to a total quantity of sequences required by all the receive terminals in the multicast group.

In Method 4, $$\Delta_{cs,I} = \left\lfloor \frac{N_{cs} \times \sum_{i}^{i \in I} N_i}{2 \times M} \right\rfloor.$$

For meanings and values of the parameters, refer to In Method 4, Method 3.

For example, as shown in FIG. 7, the minimum sequence interval in the sequence intervals of sequences on PSFCHs on the plurality of subchannels is denoted as Δcs. If the plurality of subchannels include two subchannels: a subchannel 1 and a subchannel 2, a quantity of PRBs included in a PSFCH frequency domain resource on the subchannel 1 is $N_1$=2, a quantity of PRBs included in a PSFCH frequency domain resource on the subchannel 2 is $N_2$=3, and M=12, $\Delta_{cs}$=2, a maximum sequence interval obtained through calculation by using Method 3 or Method 4 is $\Delta_{cs,I}$=2. Because $\Delta_{cs,I}=\Delta_{cs}$, in this case, the subchannel 1 and the subchannel 2 may be combined for multicast transmission, and the transmit terminal may determine the subchannel 1 and the subchannel 2 as the frequency domain resource.

In Case 1.2, optionally, step 502 may be implemented in Manner 1.2 in an example embodiment.

During specific implementation of Manner 1.2, the transmit terminal may first determine a resource pool, and then determine, based on a PSFCH frequency domain resource on a subchannel in the resource pool, a sequence interval of sequences on a PSFCH, and the quantity of receive terminals in the multicast group, whether a plurality of subchannels in the resource pool meet Condition 1.2 above. If yes, the transmit terminal determines the plurality of subchannels as the frequency domain resource.

In Manner 1.2, a manner of determining the resource pool by the transmit terminal is not limited in embodiments of this application. For example, the transmit terminal may randomly select, from configured resource pools, a resource pool as the resource pool carrying the multicast data, or may select, from configured resource pools, a resource pool with a minimum load as the resource pool carrying the multicast data.

During specific implementation of Manner 1, the transmit terminal may first determine whether a single subchannel can meet Condition 1.1 above. If yes, the transmit terminal uses the single subchannel as the frequency domain resource. Otherwise, the transmit terminal determines whether a plurality of subchannels can meet Condition 1.2. If yes, the transmit terminal uses the plurality of subchannels as the frequency domain resource.

Manner 2: The transmit terminal determines the frequency domain resource based on a decreased sequence interval of sequences on a PSFCH on a subchannel in the resource pool, a PSFCH frequency domain resource on the subchannel in the resource pool, and the quantity of receive terminals in the multicast group.

Optionally, before performing the action shown in Manner 2, the transmit terminal may further decrease the sequence interval of sequences on the PSFCH on the subchannel in the resource pool.

Decreasing a sequence interval may increase a quantity of available sequences. For example, if a sequence includes 12 elements, and a sequence interval is 3, only a sequence 0, a sequence 3, a sequence 6, and a sequence 9 are available. If a sequence interval is 2, a sequence 0, a sequence 2, a sequence 4, a sequence 6, a sequence 8, and a sequence 10 are available.

Manner 2 is specifically described below in Case 2.1 and Case 2.2.

Case 2.1: The frequency domain resource includes one subchannel.

In Case 2.1, the subchannel included in the frequency domain resource meets Condition 2.1 below.

Condition 2.1: A maximum sequence interval calculated based on the quantity of receive terminals in the multicast group and a PSFCH frequency domain resource on the subchannel is greater than or equal to a decreased sequence interval of sequences on a PSFCH on the subchannel.

For a method for calculating the maximum sequence interval, refer to Method 1 or Method 2 above.

If the quantity of PRBs included in the PSFCH frequency domain resource on the subchannel is denoted as $N_i$, the quantity of receive terminals in the multicast group is denoted as M, a subcarrier spacing is denoted as $N_{sc}$, and the decreased sequence interval is denoted as $\Delta'_{cs}$, $\Delta'_{cs}$ may be calculated according to Formula 1 or Formula 2 below.

$$\Delta'_{cs} = \left\lfloor \frac{N_{sc}}{\left\lceil \frac{2 \times M}{N_i} \right\rceil} \right\rfloor. \quad \text{Formula 1}$$

$$\Delta'_{cs} = \left\lfloor \frac{N_{cs} \times N_i}{2 \times M} \right\rfloor, \quad \text{Formula 2}$$

where $N_{sc}$=12.

When finding that the subchannel does not meet Condition 1.1 above, the transmit terminal may determine the frequency domain resource in Manner 2.

In Case 2.1, optionally, step 502 may be specifically implemented by using step 502-A, and step 502-A may be specifically implemented in Manner 1.1 or Manner 1.2 above. A difference lies only in that the condition that the subchannel needs to meet herein is Condition 2.1.

Case 2.2: The frequency domain resource includes a plurality of subchannels.

In Case 2.2, the plurality of subchannels meet Condition 2.2 below.

Condition 2.2: A maximum sequence interval calculated based on the quantity of receive terminals in the multicast group and all PSFCH frequency domain resources on the plurality of subchannels is greater than or equal to a minimum sequence interval in decreased sequence intervals of sequences on PSFCHs on the plurality of subchannels.

For a method of calculating the maximum sequence interval, refer to Method 3 or Method 4 above.

It may be understood that, if the sequence intervals of sequences on the PSFCHs on the plurality of subchannels are the same, the transmit terminal may decrease the sequence intervals of sequences on the PSFCHs on the subchannels to a same value. In this case, the maximum sequence interval is greater than or equal to a decreased sequence interval of sequences on a PSFCH on a subchannel in the plurality of subchannels. For each subchannel, a decreased sequence interval may be determined according to Formula 1 or Formula 2 above.

When finding that the plurality of subchannels do not meet Condition 1.2 above, the transmit terminal may determine the frequency domain resource in Manner 2.

In Manner 2, the method may further include:

(11) The transmit terminal sends indication information to at least one receive terminal in the multicast group. The indication information indicates to decrease the sequence interval of sequences on the PSFCH on the subchannel in the resource pool, or the indication information indicates the decreased sequence interval of sequences on the PSFCH on the subchannel in the resource pool, or the indication information indicates a decrement of the sequence interval of sequences on the PSFCH on the subchannel in the resource pool. Correspondingly, the receive terminal receives the indication information from the transmit terminal, and sends the feedback information of the multicast data to the transmit terminal on the PSFCH frequency domain resource in the frequency domain resource based on the indication information.

It should be noted that, decreased sequence intervals of the transmit terminal and the receive terminal need to be the same.

When the indication information indicates to decrease the sequence interval of sequences on the PSFCH on the subchannel in the resource pool, the receive terminal decreases the sequence interval of sequences on the PSFCH on the subchannel in the resource pool based on the resource pool information and the quantity of receive terminals in the multicast group. In this case, during specific implementation, step 504 may include: The receive terminals send the feedback information of the multicast data to the transmit terminal on the PSFCH frequency domain resource in the frequency domain resource based on the decreased sequence interval of sequences on the PSFCH on the subchannel in the resource pool. The receive terminals may decrease the sequence interval by using a method the same as that of the transmit terminal. For details, refer to the related description about decreasing the sequence interval by the transmit terminal for understanding.

For example, it is assumed that the frequency domain resource includes one subchannel, and a PSFCH frequency domain resource on the subchannel is one PRB. If one sequence includes 12 elements, and a sequence interval between sequences on the PSFCH on the subchannel is 3, all terminals in the multicast group can perform HARQ feedback by using only a sequence 0, a sequence 3, a sequence 6, and a sequence 9, and only two receive terminals can be supported in performing HARQ feedback. If there are three receive terminals in the multicast group, one receive terminal cannot perform HARQ feedback. In this case, the indication information may indicate the receive terminals to decrease the sequence interval. The receive terminals may decrease the sequence interval of sequences on the PSFCH on the subchannel in the resource pool to 2 based on the resource pool information and the quantity of receive terminals in the multicast group. In this case, all the terminals in the multicast group can perform HARQ feedback by using the sequence 0, a sequence 2, a sequence 4, the sequence 6, a sequence 8, and a sequence 10, and three receive terminals can be supported in performing HARQ feedback.

When the indication information indicates the decreased sequence interval of sequences on the PSFCH on the subchannel in the resource pool, the receive terminal determines the decreased sequence interval of sequences on the PSFCH on the subchannel in the resource pool based on the indication information. In this case, during specific implementation, step 504 may include: The receive terminal sends the feedback information of the multicast data to the transmit terminal on the PSFCH frequency domain resource in the frequency domain resource based on the decreased sequence interval of sequences on the PSFCH on the subchannel in the resource pool. The decreased sequence interval indicated by the indication information is the same as the decreased sequence interval of the transmit terminal.

For example, it is assumed that the frequency domain resource includes one subchannel, and a PSFCH frequency domain resource on the subchannel is one PRB. If one sequence includes 12 elements, and a sequence interval between sequences on the PSFCH on the subchannel is 3, all terminals in the multicast group can perform HARQ feedback by using only a sequence 0, a sequence 3, a sequence 6, and a sequence 9, and only two receive terminals can be supported in performing HARQ feedback. If there are three receive terminals in the multicast group, one receive terminal cannot perform HARQ feedback. In this case, the indication information may indicate the receive terminal to decrease the sequence interval to 2. In this case, all the terminals in the multicast group can perform HARQ feedback by using the sequence 0, a sequence 2, a sequence 4, the sequence 6, a sequence 8, and a sequence 10, and three receive terminals can be supported in performing HARQ feedback.

When the indication information indicates the decrement of the sequence interval of sequences on the PSFCH on the subchannel in the resource pool, the receive terminal decreases the sequence interval of sequences on the PSFCH on the subchannel in the resource pool based on the indication information. In this case, during specific implementation, step 504 may include: The receive terminal sends the feedback information of the multicast data to the transmit terminal on the PSFCH frequency domain resource in the frequency domain resource based on a decreased sequence interval of sequences on the PSFCH on the subchannel in the resource pool. The decrement of the sequence interval indicated by the indication information is the same as a decrement by which the transmit terminal decreases the sequence interval.

For example, it is assumed that the frequency domain resource includes one subchannel, and a PSFCH frequency domain resource on the subchannel is one PRB. If one sequence includes 12 elements, and a sequence interval between sequences on the PSFCH on the subchannel is 3, all terminals in the multicast group can perform HARQ feedback by using only a sequence 0, a sequence 3, a sequence 6, and a sequence 9, and only two receive terminals can be supported in performing HARQ feedback. If there are three receive terminals in the multicast group, one receive terminal cannot perform HARQ feedback. To enable all the three receive terminals to perform HARQ feedback, the indication information may indicate the decrement of the sequence interval, and the decrement may be 1. After receiving the indication information, the receive terminal decreases the sequence interval by 1, that is, decreases the sequence interval from 3 to 2. All the terminals in the multicast group can perform HARQ feedback by using the sequence 0, a sequence 2, a sequence 4, the sequence 6, a sequence 8, and a sequence 10, and three receive terminals can be supported in performing HARQ feedback.

In Manner 1 and Manner 2 above, the frequency domain resource for carrying the multicast data may be determined, and it is ensured that the PSFCH frequency domain resource in the frequency domain resource can meet a requirement of performing HARQ feedback by the receive terminal in a multicast scenario.

In the foregoing embodiment, when the frequency domain resource includes a plurality of subchannels, step 503 may be specifically implemented in the following several manners.

Manner 1: Joint encoding is performed on a resource set including the plurality of subchannels, and the multicast data is transmitted by using a low modulation and coding scheme (modulation and coding scheme, MCS). For example, refer to FIG. 8(*a*) or FIG. 8(*b*). In FIG. 8(*a*), control information of the multicast data is transmitted through PSCCHs on a plurality of subchannel. In FIG. 8(*b*), control information of the multicast data is transmitted through a PSCCH on one subchannel. In FIG. 8(*a*) to FIG. 8(*e*), a same diagonal pattern indicates that a same encoding manner is used, and different diagonal patterns indicate that different encoding manners are used.

Manner 2: Control information of the multicast data is transmitted through a PSCCH on each subchannel, the multicast data is encoded on each subchannel, and one piece of complete multicast data is transmitted on each subchannel. For example, refer to FIG. 8(*c*).

Manner 3: Control information of the multicast data is transmitted through PSCCHs on a plurality of subchannels, but the multicast data is transmitted only on a subchannel that includes a maximum quantity of PRBs. For example, refer to FIG. 8(*d*).

Manner 4: One piece of multicast data is transmitted on a subchannel that includes a small quantity of PRBs, and repetitions of the multicast data are transmitted on other subchannels that include larger quantities of PRBs. For example, refer to FIG. 8(*e*).

A manner in Manner 1 to Manner 4 above may be determined based on an amount of to-be-sent data (for example, if the data amount is relatively large, Manner 1 may be considered, or if the data amount is relatively small, Manner 2, Manner 3, or Manner 4 may be considered), or may be preset, or may be determined through negotiation by the transmit terminal and the receive terminal. This is not limited in embodiments of this application. When the frequency domain resource includes the plurality of subchannels, HARQ process identifiers (IDs) used for transmitting the multicast data on the plurality of subchannels are the same, and the receive terminal may determine, based on the received HARQ process IDs, whether the multicast data transmitted on the subchannels is from a same multicast.

The foregoing mainly describes the solutions in embodiments of this application from a perspective of interaction between network elements. It may be understood that to implement the foregoing functions, network elements such as the transmit terminal and the receive terminal include a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In embodiments of this application, the transmit terminal and the receive terminal each may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in embodiments of this application, division into the units is an example, and is merely logical function division. In an actual implementation, another division manner may be used.

Figure 9:
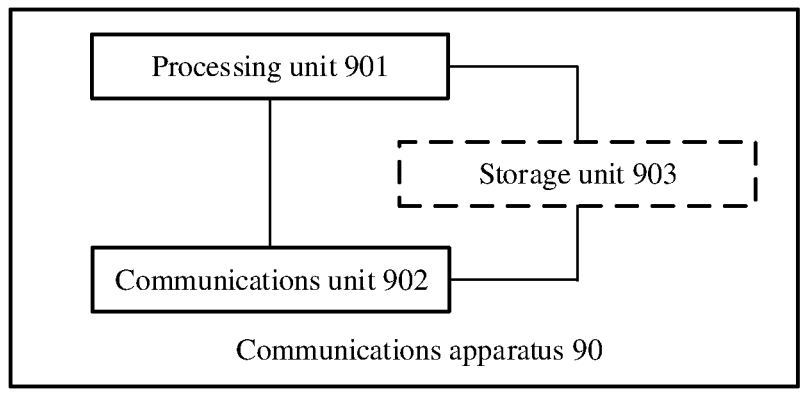
FIG. 9 is a schematic composition diagram of a communications apparatus according to an embodiment of this application.

When an integrated unit is used, FIG. 9 is a schematic diagram of a possible structure of a communications apparatus (denoted as a communications apparatus 90) in the foregoing embodiments. The communications apparatus 90 includes a processing unit 901 and a communications unit 902, and may further include a storage unit 903. The schematic diagram of the structure shown in FIG. 9 may show a structure of the transmit terminal or the receive terminal in the foregoing embodiments.

When the schematic diagram of the structure shown in FIG. 9 shows the structure of the transmit terminal in the foregoing embodiments, the processing unit 901 is configured to control and manage an action of the transmit terminal. For example, the processing unit 901 is configured to support the transmit terminal in performing 501 to 504 in FIG. 5, and/or an action performed by the transmit terminal in another process described in embodiments of this application. The processing unit 901 may communicate with another network entity through the communications unit 902, for example, communicate with the receive terminal shown in FIG. 5. The storage unit 903 is configured to store program code and data of the transmit terminal.

When the schematic diagram of the structure shown in FIG. 9 shows the structure of the transmit terminal in the foregoing embodiments, the communications apparatus 90 may be a device, or may be a chip in a device.

When the schematic diagram of the structure shown in FIG. 9 shows the structure of the receive terminal in the foregoing embodiments, the processing unit 901 is configured to control and manage an action of the receive terminal. For example, the processing unit 901 is configured to support the receive terminal in performing 501, 503, 504 in FIG. 5, and/or an action performed by the receive terminal in another process described in embodiments of this application. The processing unit 901 may communicate with another network entity through the communications unit 902, for example, communicate with the transmit terminal shown in FIG. 5. The storage unit 903 is configured to store program code and data of the receive terminal.

When the schematic diagram of the structure shown in FIG. 9 shows the structure of the receive terminal in the foregoing embodiments, the communications apparatus 90 may be a device, or may be a chip in a device.

When the communications apparatus 90 is the device, the processing unit 901 may be a processor or a controller, and the communications unit 902 may be a communications interface, a transceiver, a transceiver, a transceiver circuit, a transceiver apparatus, or the like. The communications interface is a collective term, and may include one or more interfaces. The storage unit 903 may be a memory. When the communications apparatus 90 is the chip in the device, the processing unit 901 may be a processor or a controller, and the communications unit 902 may be an input interface and/or an output interface, a pin, a circuit, or the like. The storage unit 903 may be a storage unit (for example, a register or a cache) inside the chip, or may be a storage unit (for example, a read-only memory or a random access memory) that is in the device and that is located outside the chip.

The communications unit may also be referred to as a transceiver unit. An antenna and a control circuit that have receiving and sending functions in the communications apparatus 90 may be considered as the communications unit 902 in the communications apparatus 90, and a processor that has a processing function may be considered as the processing unit 901 in the communications apparatus 90. Optionally, a component configured to implement a receiving function in the communications unit 902 may be considered as a receiving unit. The receiving unit is configured to perform the receiving step in embodiments of this application. The receiving unit may be a receiver, a receiver circuit, or the like. A component configured to implement a sending function in the communications unit 902 may be considered as a sending unit. The sending unit is configured to perform the sending step in embodiments of this application. The sending unit may be a transmitter, a sending circuit, or the like.

When an integrated unit in FIG. 9 is implemented in a form of a software function module and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

The units in FIG. 9 may also be referred to as modules. For example, the processing unit may be referred to as a processing module.

Figure 10:
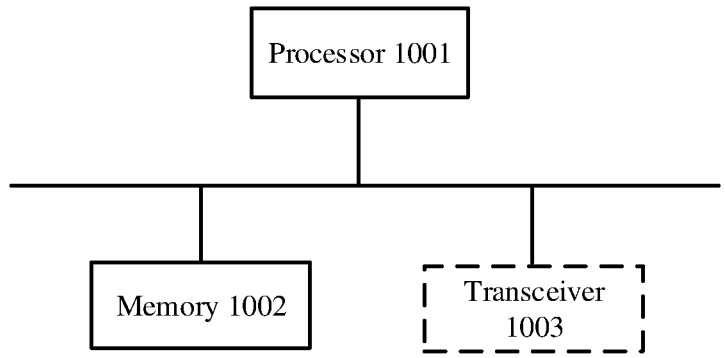
FIG. 10 and FIG. 11 each is a schematic diagram of a hardware structure of a communications apparatus according to an embodiment of this application.
Figure 11:
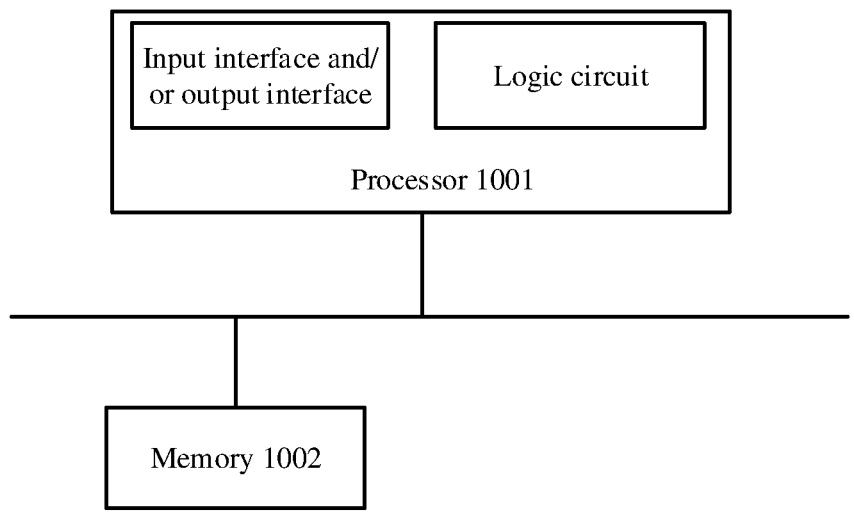

Embodiments of this application further provide a schematic diagram of a hardware structure of a communications apparatus. Refer to FIG. 10 or FIG. 11. The communications apparatus includes a processor 1001, and optionally, further includes a memory 1002 connected to the processor 1001.

The processor 1001 may be a general-purpose central processing unit (CPU), a microprocessor, an application-specific integrated circuit (ASIC), or one or more integrated circuits that are configured to control execution of a program in the solutions of this application. The processor 1001 may alternatively include a plurality of CPUs, and the processor 1001 may be a single-core (single-CPU) processor or a multi-core (multi-CPU) processor. The processor herein may refer to one or more devices, circuits, or processing cores configured to process data (for example, computer program instructions).

The memory 1002 may be a ROM or another type of static storage device that can store static information and instructions, a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited in embodiments of this application. The memory 1002 may independently exist, or may be integrated with the processor 1001. The memory 1002 may include computer program code. The processor 1001 is configured to execute the computer program code stored in the memory 1002, to implement the method provided in embodiments of this application.

In a first possible implementation, refer to FIG. 10. The communications apparatus further includes a transceiver 1003. The processor 1001, the memory 1002, and the transceiver 1003 are connected through a bus. The transceiver 1003 is configured to communicate with another device or a communications network. Optionally, the transceiver 1003 may include a transmitter and a receiver. A component configured to implement a receiving function in the transceiver 1003 may be considered as a receiver. The receiver is configured to perform receiving steps in embodiments of this application. A component configured to implement a sending function in the transceiver 1003 may be considered as a transmitter. The transmitter is configured to perform sending steps in embodiments of this application.

According to the first possible implementation, a schematic diagram of a structure shown in FIG. 10 may show a structure of the transmit terminal or the receive terminal in the foregoing embodiments.

When the schematic diagram of the structure shown in FIG. 10 shows the structure of the transmit terminal in the foregoing embodiments, the processor 1001 is configured to control and manage one or more operations of the transmit terminal. For example, the processor 1001 is configured to support the transmit terminal in performing 501 to 504 in FIG. 5, and/or an operation performed by the transmit terminal in another process described in embodiments of this application. The processor 1001 may communicate with another network entity through the transceiver 1003, for example, communicate with the receive terminal shown in FIG. 5. The memory 1002 is configured to store program code and data of the transmit terminal.

When the schematic diagram of the structure shown in FIG. 10 shows the structure of the receive terminal in the foregoing embodiments, the processor 1001 is configured to control and manage one or more operations of the receive terminal. For example, the processor 1001 is configured to support the receive terminal in performing 501, 503, 504 in FIG. 5, and/or an operation performed by the receive terminal in another process described in embodiments of this application. The processor 1001 may communicate with another network entity through the transceiver 1003, for example, communicate with the transmit terminal shown in FIG. 5. The memory 1002 is configured to store program code and data of the receive terminal.

In a second possible implementation, the processor 1001 includes a logic circuit and an input interface and/or an output interface. The output interface is configured to perform a sending action in a corresponding method, and the input interface is configured to perform a receiving action in the corresponding method.

According to the second possible implementation, refer to FIG. 11. A schematic diagram of a structure shown in FIG. 11 may show a structure of the transmit terminal or the receive terminal in the foregoing embodiments.

When the schematic diagram of the structure shown in FIG. 11 shows the structure of the transmit terminal in the foregoing embodiments, the processor 1001 is configured to control and manage one or more operations of the transmit terminal. For example, the processor 1001 is configured to support the transmit terminal in performing 501 to 504 in FIG. 5, and/or an operation performed by the transmit terminal in another process described in embodiments of this application. The processor 1001 may communicate with another network entity through an input interface and/or an output interface, for example, communicate with the receive terminal shown in FIG. 5. The memory 1002 is configured to store program code and data of the transmit terminal.

When the schematic diagram of the structure shown in FIG. 11 shows the structure of the receive terminal in the foregoing embodiments, the processor 1001 is configured to control and manage one or more operations of the receive terminal. For example, the processor 1001 is configured to support the receive terminal in performing 501, 503, 504 in FIG. 5, and/or an operation performed by the receive terminal in another process described in embodiments of this application. The processor 1001 may communicate with another network entity through an input interface and/or an output interface, for example, communicate with the transmit terminal shown in FIG. 5. The memory 1002 is configured to store program code and data of the receive terminal.

Embodiments of this application further provide a computer-readable storage medium, including instructions. When the instructions are run on a computer, the computer is enabled to perform any one of the foregoing methods.

Embodiments of this application further provide a computer program product including instructions. When the computer program product runs on a computer, the computer is enabled to perform any one of the foregoing methods.

Embodiments of this application further provide a communications system, including the foregoing transmit terminal and the foregoing receive terminal. Optionally, the communications system further includes the foregoing terminal.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially performed. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

Although this application is described with reference to embodiments herein, in a process of implementing this application that claims protection, a person skilled in the art may understand and implement another variation of the disclosed embodiments by viewing the accompanying drawings, disclosed content, and the appended claims. In the claims, the term "comprise" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

With reference to the foregoing descriptions, this application further provides the following embodiments:

Embodiment 1: A communications method is provided. The method includes:

A transmit terminal receives configuration information from a network device, where the configuration information includes resource pool information of a sidelink of the transmit terminal, the resource pool information includes information about one or more resource pools, and information about one resource pool includes one or more pieces of information about a PSFCH frequency domain resource on each subchannel in the resource pool and information about a sequence interval of sequences on a PSFCH on each subchannel;

the transmit terminal determines a frequency domain resource based on the resource pool information and a quantity of receive terminals in a multicast group, where the frequency domain resource includes one or more subchannels;

the transmit terminal sends multicast data to the receive terminals in the multicast group on the frequency domain resource; and the transmit terminal receives feedback information of the multicast data from the receive terminals in the multicast group on a PSFCH frequency domain resource in the frequency domain resource.

Embodiment 2: According to the method in Embodiment 1, a PSFCH frequency domain resource on a subchannel is a frequency domain resource corresponding to a resource block in a PSFCH resource periodicity of the subchannel, and the resource block includes a slot and a bandwidth of the subchannel.

Embodiment 3: According to the method in Embodiment 1 or 2, that the transmit terminal determines a frequency domain resource based on the resource pool information and a quantity of receive terminals in a multicast group includes:

The transmit terminal determines a resource pool based on the resource pool information and the quantity of receive terminals in the multicast group; and the transmit terminal determines the frequency domain resource in the resource pool.

Embodiment 4: According to the method in any one of Embodiments 1 to 3, when the frequency domain resource includes one subchannel, the subchannel meets the following condition: a maximum sequence interval calculated based on the quantity of receive terminals in the multicast group and a PSFCH frequency domain resource on the subchannel is greater than or equal to a sequence interval of sequences on a PSFCH on the subchannel.

Embodiment 5: According to the method in any one of Embodiments 1 to 3, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in sequence intervals of sequences on PSFCHs on the plurality of subchannels.

Embodiment 6: According to the method in any one of Embodiments 1 to 3, that the transmit terminal determines a frequency domain resource based on the resource pool information and a quantity of receive terminals in a multicast group includes:

The transmit terminal determines the frequency domain resource based on a decreased sequence interval of sequences on a PSFCH on a subchannel in the resource pool, a PSFCH frequency domain resource on the subchannel in the resource pool, and the quantity of receive terminals in the multicast group.

Embodiment 7: According to the method in Embodiment 6, when the frequency domain resource includes one subchannel, the subchannel meets the following condition: a maximum sequence interval calculated based on the quantity of receive terminals in the multicast group and a PSFCH frequency domain resource on the subchannel is greater than or equal to a decreased sequence interval of sequences on a PSFCH on the subchannel.

Embodiment 8: According to the method in Embodiment 6, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in decreased sequence intervals of sequences on PSFCHs on the plurality of subchannels.

Embodiment 9: According to the method in Embodiment 4, 5, 7, or 8, the maximum sequence interval is a maximum integer less than or equal to a ratio of a quantity of sequences supported by one physical resource block PRB to a quantity of sequences that need to be supported by each PRB in all the PSFCH frequency domain resources on all the subchannels included in the frequency domain resource, and the quantity of sequences that need to be supported by each PRB is a minimum integer greater than or equal to a ratio of a total quantity of sequences required by all the receive terminals in the multicast group to a quantity of PRBs included in all the PSFCH frequency domain resources on all the subchannels included in the frequency domain resource; or the maximum sequence interval is a maximum integer less than or equal to a ratio of a total quantity of sequences supported by PRBs included in all the PSFCH frequency domain resources on all the subchannels included in the frequency domain resource to a total quantity of sequences required by all the receive terminals in the multicast group.

Embodiment 10: According to the method in any one of Embodiments 6 to 8, the method further includes:

The transmit terminal sends indication information to at least one receive terminal in the multicast group, where the indication information indicates to decrease the sequence interval of sequences on the PSFCH on the subchannel in the resource pool, or the indication information indicates the decreased sequence interval of sequences on the PSFCH on the subchannel in the resource pool, or the indication information indicates a decrement of the sequence interval of sequences on the PSFCH on the subchannel in the resource pool.

Embodiment 11: A communications method is provided. The method includes:

A receive terminal receives multicast data from a transmit terminal on a frequency domain resource, where the frequency domain resource includes one or more subchannels;

the receive terminal receives indication information, where the indication information indicates to decrease a sequence interval of sequences on a PSFCH on a subchannel in a resource pool, or the indication information indicates a decreased sequence interval of sequences on a PSFCH on a subchannel in a resource pool, or the indication information indicates a decrement of a sequence interval of sequences on a PSFCH on a subchannel in a resource pool; and the receive terminal sends feedback information of the multicast data to the transmit terminal on a PSFCH frequency domain resource in the frequency domain resource based on the indication information.

Embodiment 12: According to the method in Embodiment 11, when the indication information indicates to decrease the sequence interval of sequences on the PSFCH on the subchannel in the resource pool, the method further includes:

The receive terminal receives configuration information from a network device, where the configuration information includes resource pool information of a sidelink of the receive terminal, the resource pool information includes information about one or more resource pools, and information about one resource pool includes one or more pieces of information about a PSFCH frequency domain resource on each subchannel in the resource pool and information about a sequence interval of sequences on a PSFCH on each subchannel; and the receive terminal decreases the sequence interval of sequences on the PSFCH on the subchannel in the resource pool based on the resource pool information and a quantity of receive terminals in a multicast group.

That the receive terminal sends feedback information of the multicast data to the transmit terminal on a PSFCH frequency domain resource in the frequency domain resource based on the indication information includes:

The receive terminal sends the feedback information of the multicast data to the transmit terminal on the PSFCH frequency domain resource in the frequency domain resource based on a decreased sequence interval of sequences on the PSFCH on the subchannel in the resource pool.

Embodiment 13: According to the method in Embodiment 11, when the indication information indicates the decrement of the sequence interval of sequences on the PSFCH on the subchannel in the resource pool, the method further includes:

The receive terminal decreases the sequence interval of sequences on the PSFCH on the subchannel in the resource pool based on the indication information.

That the receive terminal sends feedback information of the multicast data to the transmit terminal on a PSFCH frequency domain resource in the frequency domain resource based on the indication information includes:

The receive terminal sends the feedback information of the multicast data to the transmit terminal on the PSFCH frequency domain resource in the frequency domain resource based on a decreased sequence interval of sequences on the PSFCH on the subchannel in the resource pool.

Embodiment 14: According to the method in Embodiment 11, when the indication information indicates the decreased sequence interval of sequences on the PSFCH on the subchannel in the resource pool, that the receive terminal sends feedback information of the multicast data to the transmit terminal on a PSFCH frequency domain resource in the frequency domain resource based on the indication information includes:

The receive terminal sends the feedback information of the multicast data to the transmit terminal on the PSFCH frequency domain resource in the frequency domain resource based on the decreased sequence interval of sequences on the PSFCH on the subchannel in the resource pool.

Embodiment 15: A communications apparatus is provided. The apparatus includes a communications unit and a processing unit.

The communications unit is configured to receive configuration information from a network device, where the configuration information includes resource pool information of a sidelink of the apparatus, the resource pool information includes information about one or more resource pools, and information about one resource pool includes one or more pieces of information about a PSFCH frequency domain resource on each subchannel in the resource pool and information about a sequence interval of sequences on a PSFCH on each subchannel.

The processing unit is configured to determine a frequency domain resource based on the resource pool information and a quantity of receive terminals in a multicast group, where the frequency domain resource includes one or more subchannels.

The communications unit is further configured to send multicast data to the receive terminals in the multicast group on the frequency domain resource, and receive feedback information of the multicast data from the receive terminals in the multicast group on a PSFCH frequency domain resource in the frequency domain resource.

Embodiment 16: According to the apparatus in Embodiment 15, a PSFCH frequency domain resource on a subchannel is a frequency domain resource corresponding to a resource block in a PSFCH resource periodicity of the subchannel, and the resource block includes a slot and a bandwidth of the subchannel.

Embodiment 17: According to the apparatus in Embodiment 15 or 16, the processing unit is further configured to:

determine a resource pool based on the resource pool information and the quantity of receive terminals in the multicast group; and determine the frequency domain resource in the resource pool.

Embodiment 18: According to the apparatus in any one of Embodiments 15 to 17, when the frequency domain resource includes one subchannel, the subchannel meets the following condition: a maximum sequence interval calculated based on the quantity of receive terminals in the multicast group and a PSFCH frequency domain resource on the subchannel is greater than or equal to a sequence interval of sequences on a PSFCH on the subchannel.

Embodiment 19: According to the apparatus in any one of Embodiments 15 to 17, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in sequence intervals of sequences on PSFCHs on the plurality of subchannels.

Embodiment 20: According to the apparatus in any one of Embodiments 15 to 17, the processing unit is further configured to:

determine the frequency domain resource based on a decreased sequence interval of sequences on a PSFCH on a subchannel in the resource pool, a PSFCH frequency domain resource on the subchannel in the resource pool, and the quantity of receive terminals in the multicast group.

Embodiment 21: According to the apparatus in Embodiment 20, when the frequency domain resource includes one subchannel, the subchannel meets the following condition: a maximum sequence interval calculated based on the quantity of receive terminals in the multicast group and a PSFCH frequency domain resource on the subchannel is greater than or equal to a decreased sequence interval of sequences on a PSFCH on the subchannel.

Embodiment 22: According to the apparatus in Embodiment 20, when the frequency domain resource includes a plurality of subchannels, the plurality of subchannels meet the following condition: a maximum sequence interval calculated based on the quantity of receive terminals in the multicast group and all PSFCH frequency domain resources on the plurality of subchannels is greater than or equal to a minimum sequence interval in decreased sequence intervals of sequences on PSFCHs on the plurality of subchannels.

Embodiment 23: According to the apparatus in Embodiment 18, 19, 21, or 22, the maximum sequence interval is a maximum integer less than or equal to a ratio of a quantity of sequences supported by one physical resource block PRB to a quantity of sequences that need to be supported by each PRB in all the PSFCH frequency domain resources on all the subchannels included in the frequency domain resource, and the quantity of sequences that need to be supported by each PRB is a minimum integer greater than or equal to a ratio of a total quantity of sequences required by all the receive terminals in the multicast group to a quantity of PRBs included in all the PSFCH frequency domain resources on all the subchannels included in the frequency domain resource; or the maximum sequence interval is a maximum integer less than or equal to a ratio of a total quantity of sequences supported by PRBs included in all the PSFCH frequency domain resources on all the subchannels included in the frequency domain resource to a total quantity of sequences required by all the receive terminals in the multicast group.

Embodiment 24: According to the apparatus in any one of Embodiments 20 to 22, the communications unit is further configured to send indication information to at least one receive terminal in the multicast group, where the indication information indicates to decrease the sequence interval of sequences on the PSFCH on the subchannel in the resource pool, or the indication information indicates the decreased sequence interval of sequences on the PSFCH on the subchannel in the resource pool, or the indication information indicates a decrement of the sequence interval of sequences on the PSFCH on the subchannel in the resource pool.

Embodiment 25: A communications apparatus is provided. The apparatus includes a communications unit and a processing unit.

The processing unit is configured to receive multicast data from a transmit terminal on a frequency domain resource by using the communications unit, where the frequency domain resource includes one or more subchannels.

The processing unit is further configured to receive indication information by using the communications unit, where the indication information indicates to decrease a sequence interval of sequences on a PSFCH on a subchannel in a resource pool, or the indication information indicates a decreased sequence interval of sequences on a PSFCH on a subchannel in a resource pool, or the indication information indicates a decrement of a sequence interval of sequences on a PSFCH on a subchannel in a resource pool.

The processing unit is further configured to send feedback information of the multicast data to the transmit terminal on a PSFCH frequency domain resource in the frequency domain resource based on the indication information by using the communications unit.

Embodiment 26: According to the apparatus in Embodiment 25, when the indication information indicates to decrease the sequence interval of sequences on the PSFCH on the subchannel in the resource pool, the processing unit is further configured to receive configuration information from a network device by using the communications unit, where the configuration information includes resource pool information of a sidelink of the apparatus, the resource pool information includes information about one or more resource pools, and information about one resource pool includes one or more pieces of information about a PSFCH frequency domain resource on each subchannel in the resource pool and information about a sequence interval of sequences on a PSFCH on each subchannel;

the processing unit is further configured to decrease the sequence interval of sequences on the PSFCH on the subchannel in the resource pool based on the resource pool information and a quantity of receive terminals in a multicast group; and the processing unit is further configured to send the feedback information of the multicast data to the transmit terminal on the PSFCH frequency domain resource in the frequency domain resource based on a decreased sequence interval of sequences on the PSFCH on the subchannel in the resource pool by using the communications unit.

Embodiment 27: According to the apparatus in Embodiment 25, when the indication information indicates the decrement of the sequence interval of sequences on the PSFCH on the subchannel in the resource pool, the processing unit is further configured to decrease the sequence interval of sequences on the PSFCH on the subchannel in the resource pool based on the indication information; and the processing unit is further configured to send the feedback information of the multicast data to the transmit terminal on the PSFCH frequency domain resource in the frequency domain resource based on a decreased sequence interval of sequences on the PSFCH on the subchannel in the resource pool by using the communications unit.

Embodiment 28: According to the apparatus in Embodiment 25, when the indication information indicates the decreased sequence interval of sequences on the PSFCH on the subchannel in the resource pool, the processing unit is further configured to send the feedback information of the multicast data to the transmit terminal on the PSFCH frequency domain resource in the frequency domain resource based on the decreased sequence interval of sequences on the PSFCH on the subchannel in the resource pool by using the communications unit.

Embodiment 29: A communications apparatus is provided. The apparatus includes a processor.

The processor is connected to a memory. The memory is configured to store computer-executable instructions, and the processor executes the computer-executable instructions stored in the memory, to enable the apparatus to implement the method according to any one of Embodiments 1 to 10.

Embodiment 30: A communications apparatus is provided. The apparatus includes a processor.

The processor is connected to a memory. The memory is configured to store computer-executable instructions, and the processor executes the computer-executable instructions stored in the memory, to enable the apparatus to implement the method according to any one of Embodiments 11 to 14.

Embodiment 31: A communications system is provided, and includes: the apparatus according to any one of Embodiments 15 to 24 and the apparatus according to any one of Embodiments 25 to 28; or the apparatus according to Embodiment 29 and the apparatus according to Embodiment 30.

Embodiment 32: A computer-readable storage medium is provided, and includes instructions. When the instructions are run on a computer, the computer is enabled to perform the method according to any one of Embodiments 1 to 10.

Embodiment 33: A computer-readable storage medium is provided, and includes instructions. When the instructions are run on a computer, the computer is enabled to perform the method according to any one of Embodiments 11 to 14.

Embodiment 34: A computer program product is provided, and includes instructions. When the instructions are run on a computer, the computer is enabled to perform the method according to any one of Embodiments 1 to 10.

Embodiment 35: A computer program product is provided, and includes instructions. When the instructions are run on a computer, the computer is enabled to perform the method according to any one of Embodiments 11 to 14.

Embodiment 36: A chip is provided, and includes instructions. When the instructions are run on a computer, the computer is enabled to perform the method according to any one of Embodiments 1 to 10.

Embodiment 37: A chip is provided, and includes instructions. When the instructions are run on a computer, the computer is enabled to perform the method according to any one of Embodiments 11 to 14.

What is claimed is:

1. A communications method, comprising:
receiving, by a transmit terminal, configuration information from a network device, wherein the configuration information comprises resource pool information of a sidelink of the transmit terminal, the resource pool information comprises information about one or more resource pools, and information about each of the one or more resource pools comprises one or more pieces of information about a physical sidelink feedback channel (PSFCH) frequency domain resource;
sending, by the transmit terminal, multicast data to receive terminals in a multicast group on a PSFCH frequency domain resource; and
receiving, by the transmit terminal, feedback information of the multicast data from the receive terminals in the multicast group on the PSFCH frequency domain resource, wherein the PSFCH frequency domain resource is sufficient for all the receive terminals in the multicast group to perform hybrid automatic repeat request (HARQ) feedback,
wherein the method further comprises;
determining, by the transmit terminal, a resource pool based on the resource pool information and a quantity of the receive terminals in the multicast group, and
determining, by the transmit terminal, the PSFCH frequency domain resource in the resource pool.

2. The method according to claim 1, wherein the HARQ feedback is an acknowledgment (ACK) or a negative acknowledgment (NACK).

3. The method according to claim 1, wherein the resource pool information comprises information about a PSFCH frequency domain resource on each subchannel in at least one of the one or more resource pools and information about a sequence interval of sequences on a PSFCH on the subchannel; wherein a PSFCH frequency domain resource on a subchannel is a frequency domain resource corresponding to a resource block in a PSFCH resource periodicity of the subchannel, and the resource block comprises a slot and a bandwidth of the subchannel.

4. The method according to claim 1, wherein, when the PSFCH frequency domain resource comprises one subchannel, a maximum sequence interval calculated based on the quantity of the receive terminals in the multicast group and a PSFCH frequency domain resource on the subchannel is greater than or equal to a sequence interval of sequences on a PSFCH on the subchannel.

5. The method according to claim 1, wherein, when the PSFCH frequency domain resource comprises a plurality of subchannels, a maximum sequence interval calculated based on the quantity of the receive terminals in the multicast group and all PSFCH frequency domain resources on the plurality of subchannels is greater than or equal to a minimum sequence interval in sequence intervals of sequences on PSFCHs on the plurality of subchannels.

6. The method according to claim 1, wherein the determining, by the transmit terminal, a frequency domain resource based on the resource pool information and a quantity of the receive terminals in the multicast group comprises:
determining, by the transmit terminal, the frequency domain resource based on a decreased sequence interval of sequences on a PSFCH on a subchannel in the resource pool, a PSFCH frequency domain resource on the subchannel in the resource pool, and the quantity of the receive terminals in the multicast group.

7. A communications method, comprising:
receiving, by a receive terminal, configuration information from a network device, wherein the receive terminal is one of receive terminals in a multicast group on a PSFCH frequency domain resource, the configuration information comprises resource pool information of a sidelink of a transmit terminal, the resource pool information comprises information about one or more resource pools, and information about each of the one or more resource pools comprises one or more pieces of information about a physical sidelink feedback channel (PSFCH) frequency domain resource;
receiving, by the receive terminal, multicast data from the transmit terminal; and
sending, by the receive terminal, feedback information of the multicast data to the transmit terminal, wherein the PSFCH frequency domain resource is sufficient for all the receive terminals in the multicast group to perform hybrid automatic repeat request (HARQ) feedback,
wherein the resource pool information comprises information about a PSFCH frequency domain resource on each subchannel in at least one of the one or more resource pools and information about a sequence interval of sequences on a PSFCH on the subchannel;
wherein a PSFCH frequency domain resource on a subchannel is a frequency domain resource corresponding to a resource block in a PSFCH resource periodicity of the subchannel, and the resource block comprises a slot and a bandwidth of the subchannel.

8. The method according to claim 7, wherein the HARQ feedback is an acknowledgment (ACK) or a negative acknowledgment (NACK).

9. A terminal device, comprising:
at least one processor; and
at least one memory, the at least one memory comprising instructions that, when executed by the at least one processor, cause the terminal device to:
receive configuration information from a network device, wherein the configuration information comprises resource pool information of a sidelink of the terminal device, the resource pool information comprises information about one or more resource pools, and information about each of the one or more resource pools comprises one or more pieces of information about a physical sidelink feedback channel (PSFCH) frequency domain resource;
send multicast data to receive terminals in a multicast group on a PSFCH frequency domain resource; and
receive feedback information of the multicast data from the receive terminals in the multicast group on the PSFCH frequency domain resource, wherein the PSFCH frequency domain resource is sufficient for all the receive terminals in the multicast group to perform hybrid automatic repeat request (HARQ) feedback, wherein the instructions, when executed by the at least one processor, further cause the terminal device to:

determine a resource pool based on the resource pool information and a quantity of the receive terminals in the multicast group; and determine the PSFCH frequency domain resource in the resource pool.

10. The terminal device according to claim 9, wherein the HARQ feedback is an acknowledgment (ACK) or a negative acknowledgment (NACK).

11. The terminal device according to claim 9, wherein the resource pool information comprises information about a PSFCH frequency domain resource on each subchannel in at least one of the one or more resource pools and information about a sequence interval of sequences on a PSFCH on the subchannel; wherein a PSFCH frequency domain resource on a subchannel is a frequency domain resource corresponding to a resource block in a PSFCH resource periodicity of the subchannel, and the resource block comprises a slot and a bandwidth of the subchannel.

12. The terminal device according to claim 9, wherein when the PSFCH frequency domain resource comprises one subchannel, a maximum sequence interval calculated based on the quantity of the receive terminals in the multicast group and a PSFCH frequency domain resource on the subchannel is greater than or equal to a sequence interval of sequences on a PSFCH on the subchannel.

13. The terminal device according to claim 9, wherein when the PSFCH frequency domain resource comprises a plurality of subchannels, a maximum sequence interval calculated based on the quantity of the receive terminals in the multicast group and all PSFCH frequency domain resources on the plurality of subchannels is greater than or equal to a minimum sequence interval in sequence intervals of sequences on PSFCHs on the plurality of subchannels.

14. The terminal device according to claim 9, wherein the determination of the resource pool based on the resource pool information and the quantity of the receive terminals in the multicast group comprises:

determining the PSFCH frequency domain resource based on a decreased sequence interval of sequences on a PSFCH on a subchannel in the resource pool, a PSFCH frequency domain resource on the subchannel in the resource pool, and the quantity of the receive terminals in the multicast group.

* * * * *

UNITED STATES PATENT AND TRADEMARK OFFICE
CERTIFICATE OF CORRECTION

| | |
|---|---|
| PATENT NO. | : 12,185,292 B2 |
| APPLICATION NO. | : 17/768008 |
| DATED | : December 31, 2024 |
| INVENTOR(S) | : Yun Liu |

It is certified that error appears in the above-identified patent and that said Letters Patent is hereby corrected as shown below:

In the Specification

Column 15, Lines 35 and 36, change "For meanings and values of the parameters, refer to In Method 4, Method 3." to --For meanings and values of the parameters, refer to Method 3.--.

Signed and Sealed this
Fourth Day of February, 2025

Coke Morgan Stewart
*Acting Director of the United States Patent and Trademark Office*